United States Patent
Chelliah et al.

(10) Patent No.: US 11,259,117 B1
(45) Date of Patent: Feb. 22, 2022

(54) DEREVERBERATION AND NOISE REDUCTION

(71) Applicant: Amazon Technologies, Inc., Seattle, WA (US)

(72) Inventors: Kanthasamy Chelliah, Sunnyvale, CA (US); Wai Chung Chu, San Jose, CA (US); Andreas Schwarz, Aachen (DE); Carlos Renato Nakagawa, San Jose, CA (US); Berkant Tacer, Bellevue, WA (US); Carlo Murgia, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/036,807

(22) Filed: Sep. 29, 2020

(51) Int. Cl.
*H04R 3/00* (2006.01)
*G10L 21/02* (2013.01)
*H04R 3/02* (2006.01)
*G10L 25/21* (2013.01)
*G10L 15/20* (2006.01)

(52) U.S. Cl.
CPC ............... *H04R 3/02* (2013.01); *G10L 15/20* (2013.01); *G10L 21/02* (2013.01); *G10L 25/21* (2013.01)

(58) Field of Classification Search
CPC . H04R 3/00; H04R 3/005; H04R 3/02; H04R 3/12; G10L 15/20; G10L 21/02; G10L 21/0208; G10L 2021/02082; G10K 11/16; G10K 11/175; G10K 11/176; H04M 3/002; H04M 9/08; H04M 9/082; H04M 9/085; H04B 3/20
See application file for complete search history.

(56) References Cited

U.S. PATENT DOCUMENTS

| 7,003,099 B1* | 2/2006 | Zhang | H04M 9/082 379/388.02 |
| 8,385,557 B2* | 2/2013 | Tashev | H04M 9/082 381/66 |
| 10,911,881 B1* | 2/2021 | Bulek | H04M 1/72454 |
| 2010/0150375 A1* | 6/2010 | Buck | G10L 25/78 381/94.1 |
| 2013/0016820 A1* | 1/2013 | Takayama | H04B 3/23 379/202.01 |

(Continued)

*Primary Examiner* — Thang V Tran
(74) *Attorney, Agent, or Firm* — Pierce Atwood LLP

(57) ABSTRACT

A system configured to improve audio processing by performing dereverberation and noise reduction during a communication session. The system may apply a two-channel dereverberation algorithm by calculating coherence-to-diffuse ratio (CDR) values and calculating dereverberation (DER) gain values based on the CDR values. While the device calculates the DER gain values prior to performing acoustic echo cancellation (AEC) processing, the device applies the DER gain values after performing residual echo suppression (RES) processing in order to avoid excessive attenuation of the local speech. To improve output speech quality, the device does not apply the DER gain values for nonreverberant signals, when a signal-to-noise ratio (SNR) value is too low, and/or when far-end talk (e.g., remote speech) is present. Dereverberation processing is further improved by using frequency dependent parameters to calculate the DER gain values and by adjusting other gain values when the DER gain values are applied.

20 Claims, 16 Drawing Sheets

(56) References Cited

U.S. PATENT DOCUMENTS

| | | | |
|---|---|---|---|
| 2013/0301840 A1* | 11/2013 | Yemdji | H04B 3/20 381/66 |
| 2014/0003611 A1* | 1/2014 | Mohammad | H04B 3/20 381/66 |
| 2014/0328490 A1* | 11/2014 | Mohammad | H04R 3/002 381/66 |
| 2016/0275966 A1* | 9/2016 | Jazi | G10L 21/0232 |
| 2019/0295563 A1* | 9/2019 | Kamdar | G10K 11/16 |
| 2019/0373390 A1* | 12/2019 | Horbach | H04S 7/301 |
| 2020/0015010 A1* | 1/2020 | Kawai | G10L 21/0264 |
| 2020/0098346 A1* | 3/2020 | Kemmerer | G10K 11/16 |

* cited by examiner

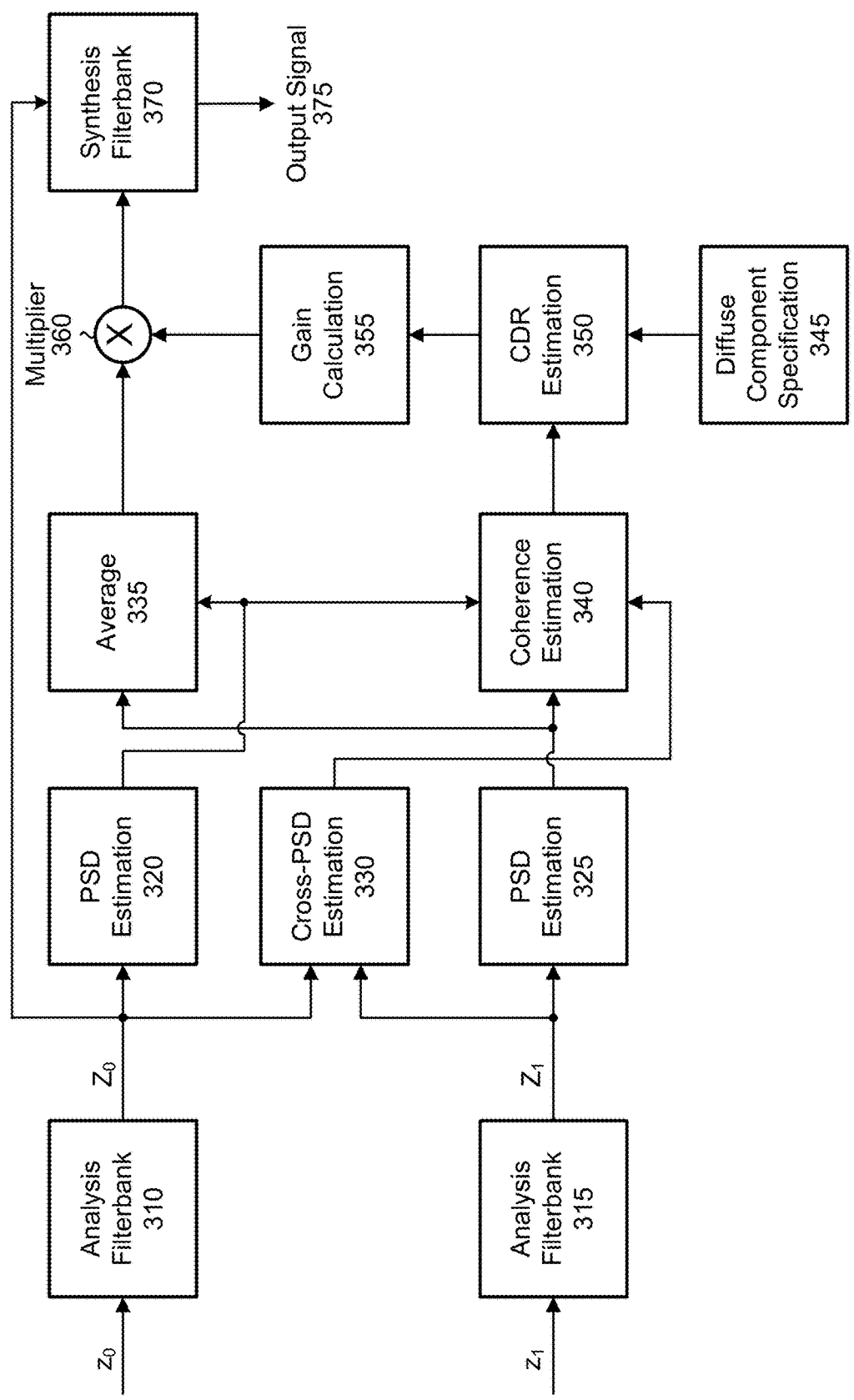

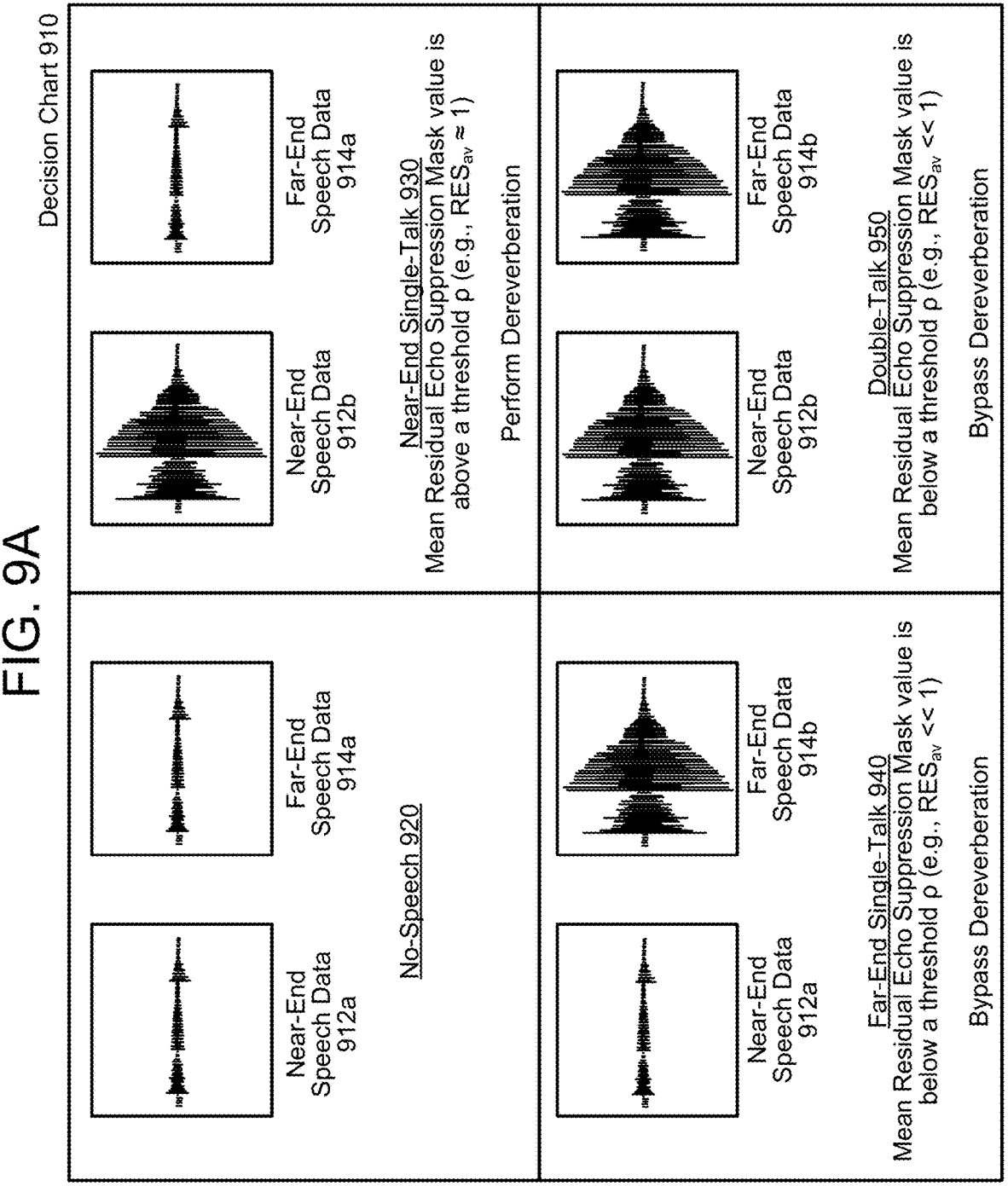

FIG. 12
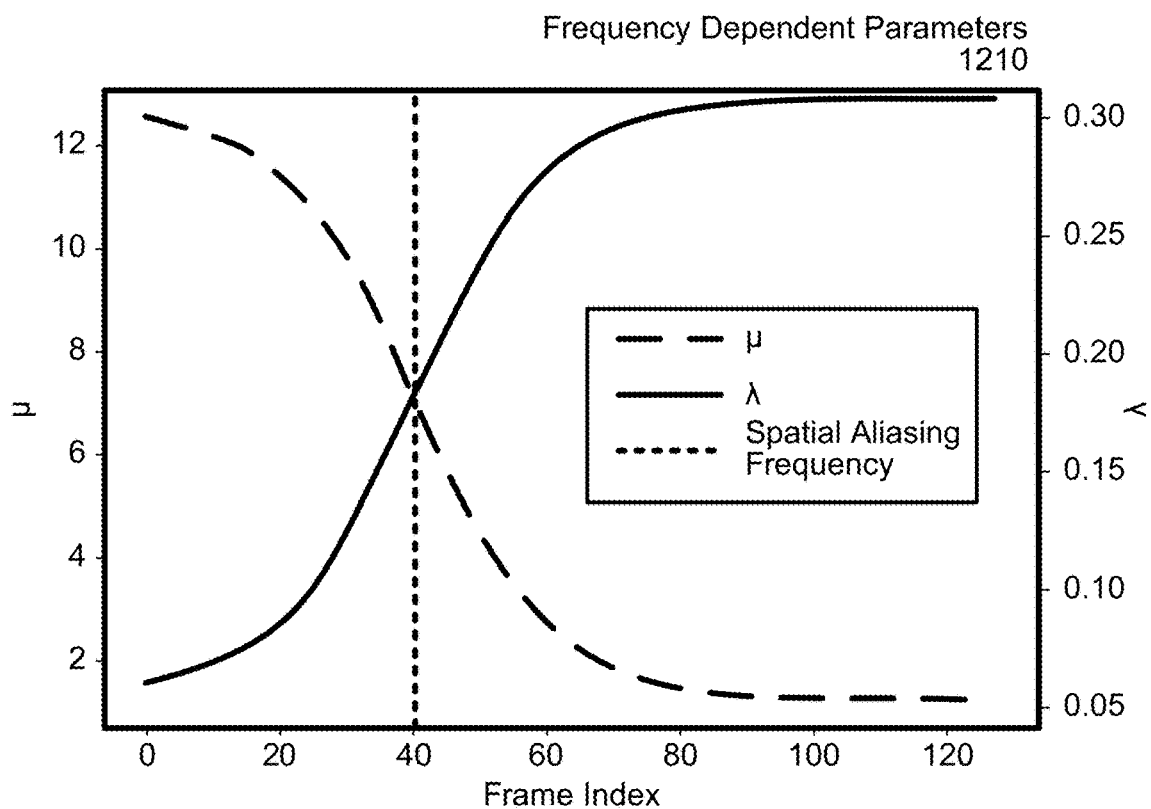
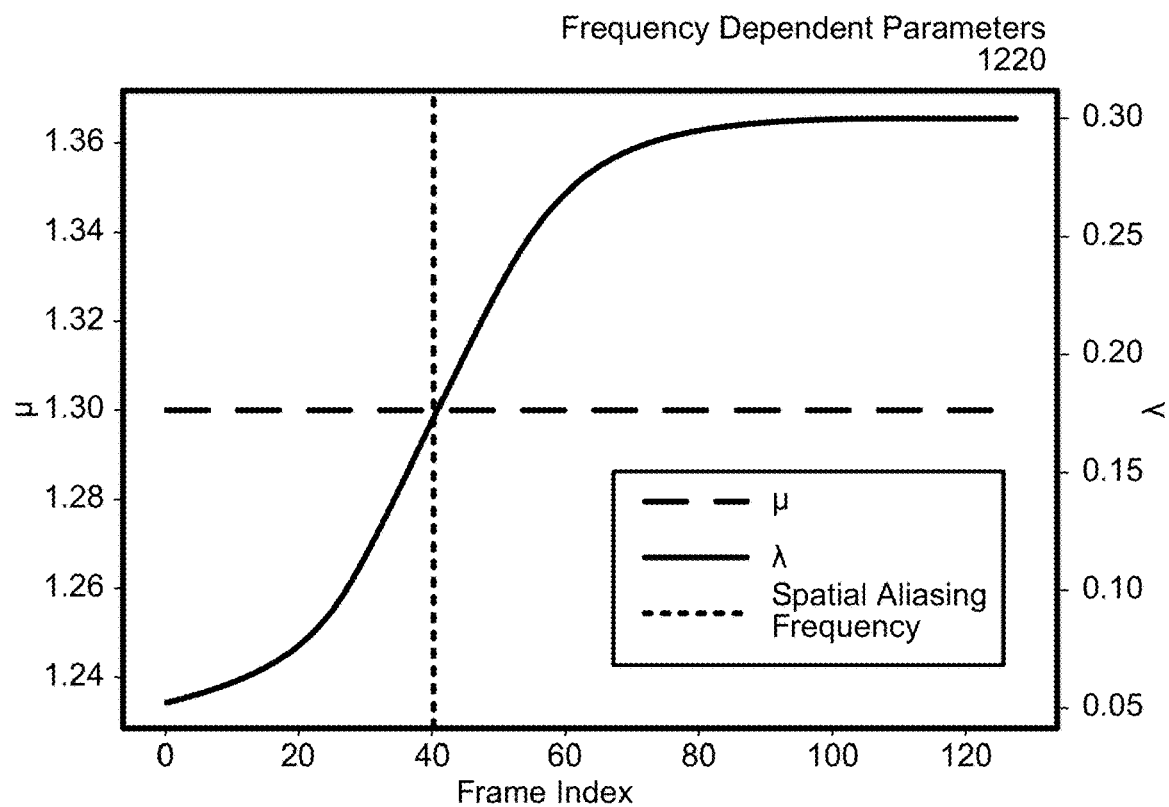

US 11,259,117 B1

DEREVERBERATION AND NOISE REDUCTION

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIG. 3 illustrates example components for performing dereverberation according to examples of the present disclosure.

FIG. 9A illustrates an example decision chart for bypassing dereverberation processing based on system conditions according to examples of the present disclosure.

FIG. 12 illustrates examples of performing dereverberation processing using frequency dependent parameters according to embodiments of the present disclosure.

DETAILED DESCRIPTION

Electronic devices may be used to capture and process audio data. The audio data may be used for voice commands and/or may be output by loudspeakers as part of a communication session. During a communication session, loudspeakers may generate audio using playback audio data while a microphone generates local audio data. An electronic device may perform audio processing, such as acoustic echo cancellation, residual echo suppression, noise reduction, and/or the like, to remove audible noise and an "echo" signal corresponding to the playback audio data from the local audio data, isolating local speech to be used for voice commands and/or the communication session.

To improve an audio quality during voice communication, devices, systems and methods are disclosed that perform dereverberation and noise reduction during a communication session. For example, a device may apply a two-channel dereverberation algorithm by performing acoustic echo cancellation (AEC) for two microphone signals, calculating coherence-to-diffuse ratio (CDR) values using the outputs of the two AEC components, and calculating dereverberation (DER) gain values based on the CDR values. While the DER gain values may be calculated at a first stage within a voice processing pipeline, the device may apply the DER gain values at a second stage within the voice processing pipeline. For example, the device may calculate the DER gain values prior to performing residual echo suppression (RES) processing but may apply the DER gain values after performing RES processing, in order to avoid excessive attenuation of the local speech.

In addition to removing reverberation, the DER gain values may also remove diffuse noise components, reducing an amount of noise reduction required. Thus, the device may perform noise reduction differently when applying the DER gain values. In some examples, the device may perform less aggressive noise reduction processing (e.g., soften the noise reduction processing) when dereverberation is performed by applying the DER gain values, and/or may calculate a noise estimate after applying the DER gain values. In other examples, the device may only apply the DER gain values when a signal-to-noise ratio (SNR) value is above a threshold value. Thus, when the SNR value is relatively high, the device may perform dereverberation by applying the DER gain values. In contrast, when the SNR value is relatively low, indicating that noisy conditions are present, the device may skip dereverberation and prioritize noise reduction processing.

Figure 1:
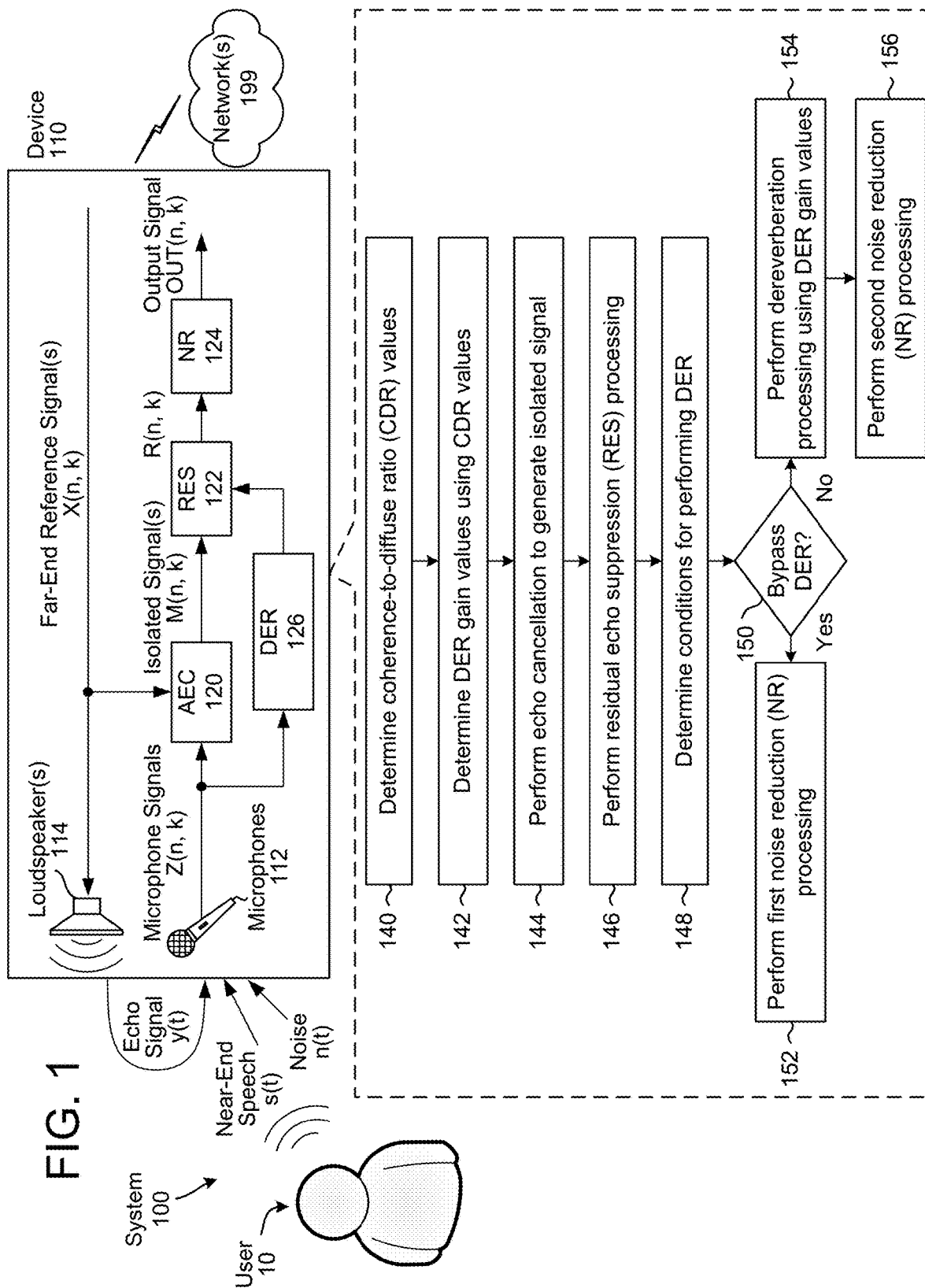
FIG. 1 illustrates a system configured to perform dereverberation within a voice processing pipeline according to embodiments of the present disclosure.

FIG. 1 illustrates a high-level conceptual block diagram of a system 100 configured to perform dereverberation within a voice processing pipeline. As illustrated in FIG. 1, the system 100 may include a device 110 that may be communicatively coupled to network(s) 199 and may include one or more microphone(s) 112 in a microphone array and/or one or more loudspeaker(s) 114. However, the disclosure is not limited thereto and the device 110 may include additional components without departing from the disclosure.

The device 110 may be an electronic device configured to send audio data to and/or receive audio data. For example, the device 110 (e.g., local device) may receive playback audio data (e.g., far-end reference audio data, represented in FIG. 1 as far-end reference signal(s) X(n, k)) from a remote device and the playback audio data may include remote speech originating at the remote device. During a communication session, the device 110 may generate output audio corresponding to the playback audio data using the one or more loudspeaker(s) 114. While generating the output audio, the device 110 may capture microphone audio data (e.g., input audio data, represented in FIG. 1 as microphone signals Z(n, k)) using the one or more microphone(s) 112. In addition to capturing desired speech (e.g., the microphone audio data includes a representation of local speech from a user 10, represented in FIG. 1 as near-end speech s(t)), the device 110 may capture a portion of the output audio generated by the loudspeaker(s) 114 (including a portion of the remote speech), which may be referred to as an "echo" or echo signal y(t), along with additional acoustic noise n(t) (e.g., undesired speech, ambient acoustic noise in an environment around the device 110, etc.), as discussed in greater detail below.

For ease of illustration, some audio data may be referred to as a signal, such as a far-end reference signal(s) x(t), an echo signal y(t), an echo estimate signal y'(t), microphone signals z(t), isolated signal(s) m(t) (e.g., error signal m(t)), and/or the like. However, the signals may be comprised of audio data and may be referred to as audio data (e.g., far-end reference audio data x(t), echo audio data y(t), echo estimate audio data y'(t), microphone audio data z(t), isolated audio data m(t), error audio data m(t), etc.) without departing from the disclosure.

As will be described in greater detail below with regard to FIGS. 2A-2C, an audio signal may be represented in the time domain (e.g., far-end reference signal(s) x(t)) or in a frequency/subband domain (e.g., far-end reference signal(s) X(n, k)) without departing from the disclosure. In some examples, audio signals generated by microphones 112, output to the loudspeaker(S) 114, and/or sent via network(s) 199 are time domain signals (e.g., x(t)), and the device 110 converts these time domain signals to the frequency/subband domain during audio processing. For ease of illustration, however, FIG. 1 represents the far-end reference signal(s) X(n, k), the microphone signals Z(n, k), and the output signal OUT(n, k) in the frequency/subband domain.

During a communication session, the device 110 may receive far-end reference signal(s) x(t) (e.g., playback audio data) from a remote device/remote server(s) via the network(s) 199 and may generate output audio (e.g., playback audio) based on the far-end reference signal(s) x(t) using the one or more loudspeaker(s) 114. Using one or more microphone(s) 112 in the microphone array, the device 110 may capture input audio as microphone signals z(t) (e.g., near-end reference audio data, input audio data, microphone audio data, etc.), may perform audio processing to the microphone signals z(t) to generate an output signal out(t) (e.g., output audio data), and may send the output signal out(t) to the remote device/remote server(s) via the network(s) 199.

In some examples, the device 110 may send the output signal out(t) to the remote device as part of a Voice over Internet Protocol (VoIP) communication session. For example, the device 110 may send the output signal out(t) to the remote device either directly or via remote server(s) and may receive the far-end reference signal(s) x(t) from the remote device either directly or via the remote server(s). However, the disclosure is not limited thereto and in some examples, the device 110 may send the output signal out(t) to the remote server(s) in order for the remote server(s) to determine a voice command. For example, during a communication session the device 110 may receive the far-end reference signal(s) x(t) from the remote device and may generate the output audio based on the far-end reference signal(s) x(t). However, the microphone signal z(t) may be separate from the communication session and may include a voice command directed to the remote server(s). Therefore, the device 110 may send the output signal out(t) to the remote server(s) and the remote server(s) may determine a voice command represented in the output signal out(t) and may perform an action corresponding to the voice command (e.g., execute a command, send an instruction to the device 110 and/or other devices to execute the command, etc.). In some examples, to determine the voice command the remote server(s) may perform Automatic Speech Recognition (ASR) processing, Natural Language Understanding (NLU) processing and/or command processing. The voice commands may control the device 110, audio devices (e.g., play music over loudspeaker(s) 114, capture audio using microphone(s) 112, or the like), multimedia devices (e.g., play videos using a display, such as a television, computer, tablet or the like), smart home devices (e.g., change temperature controls, turn on/off lights, lock/unlock doors, etc.) or the like.

In audio systems, acoustic echo cancellation (AEC) processing refers to techniques that are used to recognize when a device has recaptured sound via microphone(s) after some delay that the device previously output via loudspeaker(s). The device may perform AEC processing by subtracting a delayed version of the original audio signal (e.g., far-end reference signal(s) X(n, k)) from the captured audio (e.g., microphone signal(s) Z(n, k)), producing a version of the captured audio that ideally eliminates the "echo" of the original audio signal, leaving only new audio information. For example, if someone were singing karaoke into a microphone while prerecorded music is output by a loudspeaker, AEC processing can be used to remove any of the recorded music from the audio captured by the microphone, allowing the singer's voice to be amplified and output without also reproducing a delayed "echo" of the original music. As another example, a media player that accepts voice commands via a microphone can use AEC processing to remove reproduced sounds corresponding to output media that are captured by the microphone, making it easier to process input voice commands.

The device 110 may perform audio processing to the microphone signals Z(n, k) to generate the output signal OUT(n, k). For example, the device 110 may input the microphone signal(s) Z(n, k) to a voice processing pipeline and may perform a series of steps to improve an audio quality associated with the output signal OUT(n, k). As illustrated in FIG. 1, the device 110 may perform acoustic echo cancellation (AEC) processing, residual echo suppression (RES) processing, noise reduction (NR) processing, dereverberation (DER) processing, and/or other audio processing to isolate local speech captured by the microphone(s) 112 and/or to suppress unwanted audio data (e.g., echoes and/or noise). For example, the device 110 may include an AEC component 120 configured to perform AEC processing to perform echo cancellation, a RES component 122 configured to perform RES processing to suppress a residual echo signal, a noise reduction (NR) component 124 configured to perform NR processing to attenuate a noise signal, and a DER component 126 configured to perform DER processing to reduce and/or remove reverberation.

As illustrated in FIG. 1, the device 110 may receive the far-end reference signal(s) (e.g., playback audio data) and may generate playback audio (e.g., echo signal y(t)) using the loudspeaker(s) 114. While the device 110 may generate the playback audio using the far-end reference signal(s) x(t) in the time domain, for ease of illustration FIG. 1 represents the far-end reference signal(s) X(n, k) in the frequency/subband domain as the AEC component 120 performs echo cancellation in the subband domain. The far-end reference signal(s) may be referred to as far-end reference signal(s) (e.g., far-end reference audio data), playback signal(s) (e.g., playback audio data), and/or the like.

The one or more microphone(s) 112 in the microphone array may capture microphone signals (e.g., microphone audio data, near-end reference signals, input audio data, etc.), which may include the echo signal y(t) along with near-end speech s(t) from the user 10 and noise n(t). While the device 110 may generate the microphone signals z(t) in the time domain, for ease of illustration FIG. 1 represents the microphone signals Z(n, k) in the frequency/subband domain as the AEC component 120 performs echo cancellation in the subband domain.

To isolate the local speech (e.g., near-end speech s(t) from the user 10), the device 110 may include the AEC component 120, which may subtract a portion of the far-end reference signal(s) X(n, k) from the microphone signal(s) Z(n, k) and generate isolated signal(s) M(n, k) (e.g., error signal(s)). As the AEC component 120 does not have access to the echo signal y(t) itself, the AEC component 120 and/or an additional component (not illustrated) may use the far-end reference signal(s) X(n, k) to generate reference signal(s) (e.g., estimated echo signal(s)), which corresponds to the echo signal y(t). Thus, when the AEC component 120 removes the reference signal(s), the AEC component 120 is removing at least a portion of the echo signal y(t). Therefore, the output (e.g., isolated signal(s) M(n, k)) of the AEC component 120 may include the near-end speech s(t) along with portions of the echo signal y(t) and/or the noise n(t) (e.g., difference between the reference signal(s) and the actual echo signal y(t) and noise n(t)).

To improve the audio data, in some examples the RES component 122 may perform RES processing to the isolated signal(s) M(n, k) in order to dynamically suppress unwanted audio data (e.g., the portions of the echo signal y(t) and the noise n(t) that were not removed by the AEC component 120). For example, the RES component 122 may attenuate the isolated signal(s) M(n, k) to generate a first audio signal R(n, k). Performing the RES processing may remove and/or reduce the unwanted audio data from the first audio signal R(n, k). However, the device 110 may disable RES processing in certain conditions, such as when near-end speech s(t) is present in the isolated signal(s) M(n, k) (e.g., near-end single talk conditions or double-talk conditions are present). For example, when the device 110 detects that the near-end speech s(t) is present in the isolated signal(s) M(n, k), the RES component 122 may act as a pass-through filter and pass the isolated signal(s) M(n, k) with minor attenuation and/or without any attenuation, although the disclosure is not limited thereto. This avoids attenuating the near-end speech s(t). While not illustrated in FIG. 1, in some examples the device 110 may include a double-talk detector configured to determine when near-end speech and/or far-end speech is present in the isolated signal(s) M(n, k).

Residual echo suppression (RES) processing is performed by selectively attenuating, based on individual frequency bands, an isolated audio signal M(n, k) output by the AEC component 120 to generate the first audio signal R(n, k) output by the RES component 122. For example, performing RES processing may determine a gain for a portion of the isolated audio signal M(n, k) corresponding to a specific frequency band (e.g., 100 Hz to 200 Hz) and may attenuate the portion of the isolated audio signal M(n, k) based on the gain to generate a portion of the first audio signal R(n, k) corresponding to the specific frequency band. Thus, a gain may be determined for each frequency band and therefore the amount of attenuation may vary based on the frequency band.

The device 110 may determine the gain based on an attenuation value. For example, a low attenuation value $\alpha_1$ (e.g., closer to a value of zero) results in a gain that is closer to a value of one and therefore an amount of attenuation is relatively low. In some examples, the RES component 122 may operate similar to a pass-through filter for low frequency bands, although the disclosure is not limited thereto. An energy level of the first audio signal R(n, k) is therefore similar to an energy level of the isolated audio signal M(n, k). In contrast, a high attenuation value $\alpha_2$ (e.g., closer to a value of one) results in a gain that is closer to a value of zero and therefore an amount of attenuation is relatively high. In some examples, the RES component 122 may attenuate high frequency bands, such that an energy level of the first audio signal R(n, k) is lower than an energy level of the isolated audio signal M(n, k), although the disclosure is not limited thereto. In these examples, the energy level of the first audio signal R(n, k) corresponding to the high frequency bands is lower than the energy level of the first audio signal R(n, k) corresponding to the low frequency bands.

Room reverberation is a detrimental factor that negatively impacts audio quality for hands-free devices, such as the device 110. For example, a user 10 of the device 110 may establish a communication session with another device, where digitized speech signals are compressed, packetized, and transmitted via the network(s) 199. One technique for establishing the communication session involves Voice over Internet Protocol (VoIP), although the disclosure is not limited thereto. During the communication session, a large amount of reverberation is harmful to communication (e.g., reduces an audio quality), as the reverberation lowers intelligibility and makes the speech sound "far" and "hollow." The reverberation is caused by walls and other hard surfaces in an environment of the device 110 (e.g., inside a room) creating multiple reflections. These reflections can be classified as early and late depending on a time-of-arrival associated with an individual reflection. Early reflections typically do not impact the audio quality, but late reflections may decrease the audio quality.

A dereverberation algorithm suppresses the late reverberation in the speech signal, providing an enhanced listening experience to the users during the communication session. However, applying a real-time dereverberation algorithm and integrating it into a voice processing pipeline may affect a performance of other components within the voice processing pipeline. For example, complications arise when the dereverberator affects the performance of components such as the NR component 124 configured to perform noise reduction processing.

To reduce the impact of applying dereverberation processing, the device 110 may modify the operation of other components in the voice processing pipeline and/or may tune dereverberator parameters associated with the dereverberation processing. However, tuning the dereverberator parameters may pose additional challenges, as accurate models to quantify a subjective perception of reverberant components in speech signals do not exist. In contrast, objective speech quality assessment methods (e.g., Perceptual Objective Listening Quality Analysis (POLQA)) do not take into account reverberation. Thus, they are not accurate and cannot be used to evaluate reverberant signals.

As described in greater detail below with regard to FIG. 3, the DER component 126 may calculate dereverberation (DER) gain values by determining coherence-to-diffuse ratio (CDR) values between a first isolated signal $M_1(n, k)$ associated with a first microphone 112a and a second isolated signal $M_2(n, k)$ associated with a second microphone 112b. The DER component 126 may use the CDR values (e.g., CDR data) to generate a plurality of DER gain values (e.g., DER gain data) and may send the plurality of DER gain values to the RES component 122. In addition to performing RES processing as described above, in some examples the RES component 122 may apply the DER gain values to perform dereverberation processing.

While the description above refers to the RES component 122 performing RES processing to generate the first audio signal R(n, k), this only applies when the device 110 determines not to perform dereverberation processing. If the device 110 determines to perform dereverberation process, the RES component 122 may perform RES processing to the isolated signal M(n, k) to generate a first audio signal and then may apply the DER gain values to the first audio signal to generate a second audio signal R(n, k). However, while FIG. 1 illustrates an example of the RES component 122 receiving the DER gain values from the DER component 126, the disclosure is not limited thereto and the device 110 may apply the DER gain values using other components without departing from the disclosure, as described in greater detail below.

After the RES component 122 generates the first audio signal R(n, k), the NR component 124 may perform noise reduction processing on the first audio signal R(n, k) to generate an output signal out(t). For example, the NR component 124 may apply aggressive noise reduction when conditions are noisy (e.g., SNR value is low or below a threshold value), but may apply less aggressive noise reduction when conditions are quiet and/or when the DER gain values are applied to perform dereverberation. The NR component 124 will be described in greater detail below with regard to FIG. 4.

Although FIG. 1, and other figures/discussion illustrate the operation of the system in a particular order, the steps described may be performed in a different order (as well as certain steps removed or added) without departing from the intent of the disclosure. For example, the DER component 126 may be placed prior to the AEC component 120 without departing from the disclosure. Additionally or alternatively, the device 110 may apply the DER gain values before the AEC component 120, after the AEC component 120, after the RES component 122, during noise reduction processing, and/or the like without departing from the disclosure.

As illustrated in FIG. 1, the device 110 may determine (140) coherence-to-diffuse ratio (CDR) values and determine (142) DER gain values using the CDR values. For example, the device 110 may determine CDR values using a first microphone signal $Z_1(n, k)$ associated with a first microphone 112a and a second microphone signal $Z_2(n, k)$ associated with a second microphone 112b. These steps will be described in greater detail below with regard to FIG. 3.

The device 110 may perform (144) echo cancellation to generate an isolated signal. For example, the AEC component 120 may perform AEC processing on the first microphone signal $Z_1(n, k)$ to generate a first isolated signal $M_1(n, k)$ associated with the first microphone 112a. The AEC component 120 may perform the AEC processing by subtracting a portion of the far-end reference signal(s) X(n, k) from the first microphone signal $Z_1(n, k)$ to generate the first isolated signal $M_1(n, k)$. Using the first isolated signal $M_1(n, k)$, the device 110 may determine a noise estimate corresponding to noise components of the first isolated signal $M_1(k, n)$, as will be described in greater detail below. In some examples, the device 110 may use the noise estimate to determine whether to perform dereverberation processing, although the disclosure is not limited thereto.

The device 110 may perform (146) residual echo suppression (RES) processing on the first isolated signal to generate a first audio signal R(n, k). The device 110 may determine (148) conditions for performing dereverberation processing and may determine (150) whether to bypass dereverberation processing, as described in greater detail below with regard to FIGS. 9A-11B. If the device 110 determines to bypass dereverberation processing, the device 110 may perform (152) first noise reduction (NR) processing to generate an output signal OUT(n, k). If the device 110 determines to perform dereverberation processing, the device 110 may perform (154) dereverberation (DER) processing using the DER gain values and may perform (156) second noise reduction processing. In some examples, the device 110 may determine a new noise estimate after applying the DER gain values, as described in greater detail below with regard to FIG. 4.

While FIG. 1 illustrates an example in which the DER processing is performed after RES processing and before NR processing, the disclosure is not limited thereto and the order of these steps may vary without departing from the disclosure. For example, the DER processing may be performed prior to the RES processing, after the RES processing, or as part of NR processing without departing from the disclosure.

In some examples, the device 110 may operate using a microphone array comprising multiple microphones 112. For example, the device 110 may use three or more microphones 112 to determine the CDR values and/or the DER gain values without departing from the disclosure. In some examples, the device 110 may select microphone pairs from a plurality of microphones 112 without departing from the disclosure. Additionally or alternatively, the device 110 may apply beamforming to generate a plurality of directional audio signals (e.g., beams) and may determine the CDR values and/or the DER gain values using two or more beams instead of microphone audio signals without departing from the disclosure. In audio systems, beamforming refers to techniques that are used to isolate audio from a particular direction in a multi-directional audio capture system. Beamforming may be particularly useful when filtering out noise from non-desired directions. Beamforming may be used for various tasks, including isolating voice commands to be executed by a speech-processing system.

One technique for beamforming involves boosting audio received from a desired direction while dampening audio received from a non-desired direction. In one example of a beamformer system, a fixed beamformer unit employs a filter-and-sum structure to boost an audio signal that originates from the desired direction (sometimes referred to as the look-direction) while largely attenuating audio signals that original from other directions. A fixed beamformer unit may effectively eliminate certain diffuse noise (e.g., undesirable audio), which is detectable in similar energies from various directions, but may be less effective in eliminating noise emanating from a single source in a particular non-desired direction. The beamformer unit may also incorporate an adaptive beamformer unit/noise canceller that can adaptively cancel noise from different directions depending on audio conditions.

As an alternative to performing acoustic echo cancellation using the far-end reference signal(s) X(n, k), in some examples the device 110 may generate a reference signal based on the beamforming. For example, the device 110 may use Adaptive Reference Algorithm (ARA) processing to generate an adaptive reference signal based on the microphone signal(s) Z(n, k). To illustrate an example, the ARA processing may perform beamforming using the microphone signal(s) Z(n, k) to generate a plurality of audio signals (e.g., beamformed audio data) corresponding to particular directions. For example, the plurality of audio signals may include a first audio signal corresponding to a first direction, a second audio signal corresponding to a second direction, a third audio signal corresponding to a third direction, and so on. The ARA processing may select the first audio signal as a target signal (e.g., the first audio signal includes a representation of speech) and the second audio signal as a reference signal (e.g., the second audio signal includes a representation of the echo and/or other acoustic noise) and may perform Adaptive Interference Cancellation (AIC) (e.g., adaptive acoustic interference cancellation) by removing the reference signal from the target signal. As the input audio data is not limited to the echo signal, the ARA processing may remove other acoustic noise represented in the input audio data in addition to removing the echo. Therefore, the ARA processing may be referred to as performing AIC, adaptive noise cancellation (ANC), AEC, and/or the like without departing from the disclosure.

In some examples, the device 110 may be configured to perform AIC using the ARA processing to isolate the speech in the microphone signal(s) Z(n, k). The device 110 may dynamically select target signal(s) and/or reference signal(s). Thus, the target signal(s) and/or the reference signal(s) may be continually changing over time based on speech, acoustic noise(s), ambient noise(s), and/or the like in an environment around the device 110. In some examples, the device 110 may select the target signal(s) based on signal quality metrics (e.g., signal-to-interference ratio (SIR) values, signal-to-noise ratio (SNR) values, average power values, etc.) differently based on current system conditions. For example, the device 110 may select target signal(s) having highest signal quality metrics during near-end single-talk conditions (e.g., to increase an amount of energy included in the target signal(s)), but select the target signal(s) having lowest signal quality metrics during far-end single-talk conditions (e.g., to decrease an amount of energy included in the target signal(s)).

In some examples, the device 110 may perform AIC processing without performing beamforming without departing from the disclosure. Instead, the device 110 may select target signals and/or reference signals from the microphone signal(s) Z(n, k) without performing beamforming. For example, a first microphone 112a may be positioned in proximity to the loudspeaker(s) 114 or other sources of acoustic noise while a second microphone 112b may be positioned in proximity to the user 10. Thus, the device 110 may select first microphone signal $Z_1$(n, k) associated with the first microphone 112a as the reference signal and may select second microphone signal $Z_2$(n, k) associated with the second microphone 112b as the target signal without departing from the disclosure. Additionally or alternatively, the device 110 may select the target signals and/or the reference signals from a combination of the beamformed audio data and the microphone signal(s) Z(n, k) without departing from the disclosure.

While FIG. 1 illustrates the loudspeaker(s) 114 being internal to the device 110, the disclosure is not limited thereto and the loudspeaker(s) 114 may be external to the device 110 without departing from the disclosure. For example, the device 110 may send the far-end reference signal(s) x(t) to the loudspeaker(s) 114 using a wireless protocol without departing from the disclosure. However, the disclosure is not limited thereto and the loudspeaker(s) 114 may be included in the device 110 and/or connected via a wired connection without departing from the disclosure. For example, the loudspeaker(s) 114 may correspond to a wireless loudspeaker, a television, an audio system, and/or the like connected to the device 110 using a wireless and/or wired connection without departing from the disclosure.

An audio signal is a representation of sound and an electronic representation of an audio signal may be referred to as audio data, which may be analog and/or digital without departing from the disclosure. For ease of illustration, the disclosure may refer to either audio data (e.g., far-end reference audio data or playback audio data, microphone audio data, near-end reference data or input audio data, etc.) or audio signals (e.g., playback signal, far-end reference signal, microphone signal, near-end reference signal, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

As used herein, audio signals or audio data (e.g., far-end reference audio data, near-end reference audio data, microphone audio data, or the like) may correspond to a specific range of frequency bands. For example, far-end reference audio data and/or near-end reference audio data may correspond to a human hearing range (e.g., 20 Hz-20 kHz), although the disclosure is not limited thereto.

Far-end reference audio data (e.g., far-end reference signal(s) x(t)) corresponds to audio data that will be output by the loudspeaker(s) 114 to generate playback audio (e.g., echo signal y(t)). For example, the device 110 may stream music or output speech associated with a communication session (e.g., audio or video telecommunication). In some examples, the far-end reference audio data may be referred to as playback audio data, loudspeaker audio data, and/or the like without departing from the disclosure. For ease of illustration, the following description will refer to the playback audio data as far-end reference audio data. As noted above, the far-end reference audio data may be referred to as far-end reference signal(s) x(t) without departing from the disclosure. As described above, the far-end reference signal(s) may be represented in a time domain (e.g., x(t)) or a frequency/subband domain (e.g., X(n, k)) without departing from the disclosure.

Microphone audio data corresponds to audio data that is captured by the microphone(s) 112 prior to the device 110 performing audio processing such as AIC processing. The microphone audio data may include local speech s(t) (e.g., an utterance, such as near-end speech generated by the user 10), an "echo" signal y(t) (e.g., portion of the playback audio captured by the microphone(s) 112), acoustic noise n(t) (e.g., ambient noise in an environment around the device 110), and/or the like. As the microphone audio data is captured by the microphone(s) 112 and captures audio input to the device 110, the microphone audio data may be referred to as input audio data, near-end audio data, and/or the like without departing from the disclosure. For ease of illustration, the following description will refer to microphone audio data and near-end reference audio data interchangeably. As noted above, the near-end reference audio data/microphone audio data may be referred to as a near-end reference signal(s) or microphone signal(s) without departing from the disclosure. As described above, the microphone signals may be represented in a time domain (e.g., z(t)) or a frequency/subband domain (e.g., Z(n, k)) without departing from the disclosure.

An "echo" signal y(t) corresponds to a portion of the playback audio that reaches the microphone(s) 112 (e.g., portion of audible sound(s) output by the loudspeaker(s) 114 that is recaptured by the microphone(s) 112) and may be referred to as an echo or echo data y(t).

Output audio data corresponds to audio data after the device 110 performs audio processing (e.g., AIC processing, ANC processing, AEC processing, and/or the like) to isolate the local speech s(t). For example, the output audio data corresponds to the microphone audio data Z(n, k) after subtracting the reference signal(s) X(n, k) (e.g., using adaptive interference cancellation (AIC) component 120), optionally performing residual echo suppression (RES) (e.g., using the RES component 122), and/or other audio processing known to one of skill in the art. As noted above, the output audio data may be referred to as output audio signal(s) without departing from the disclosure. As described above, the output signal may be represented in a time domain (e.g., out(t)) or a frequency/subband domain (e.g., OUT(n, k)) without departing from the disclosure.

As illustrated in FIG. 1, the output of the AEC component may be represented as M(n, k) and may be referred to as isolated audio signal M(n, k), error audio data M(n, k), error signal M(n, k), and/or the like. Similarly, the output of the RES component 122 may be represented as R(n, k) and may be referred to as a first audio signal R(n, k), while the output of the NR component 124 may be represented as OUT(n, k) and may be referred to as an output signal OUT(n, k).

For ease of illustration, the following description may refer to generating the output audio data by performing acoustic echo cancellation (AEC) processing, residual echo suppression (RES) processing, noise reduction (NR) processing, and/or dereverberation (DER) processing. However, the disclosure is not limited thereto, and the device 110 may generate the output audio data by performing AEC processing, AIC processing, RES processing, NR processing, DER processing, other audio processing, and/or a combination thereof without departing from the disclosure. Additionally or alternatively, the disclosure is not limited to AEC processing and, in addition to or instead of performing AEC processing, the device 110 may perform other processing to remove or reduce unwanted speech $s_2(t)$ (e.g., speech associated with a second user), unwanted acoustic noise n(t), and/or echo signals y(t), such as adaptive interference cancellation (AIC) processing, adaptive noise cancellation (ANC) processing, and/or the like without departing from the disclosure.

Figure 2A:
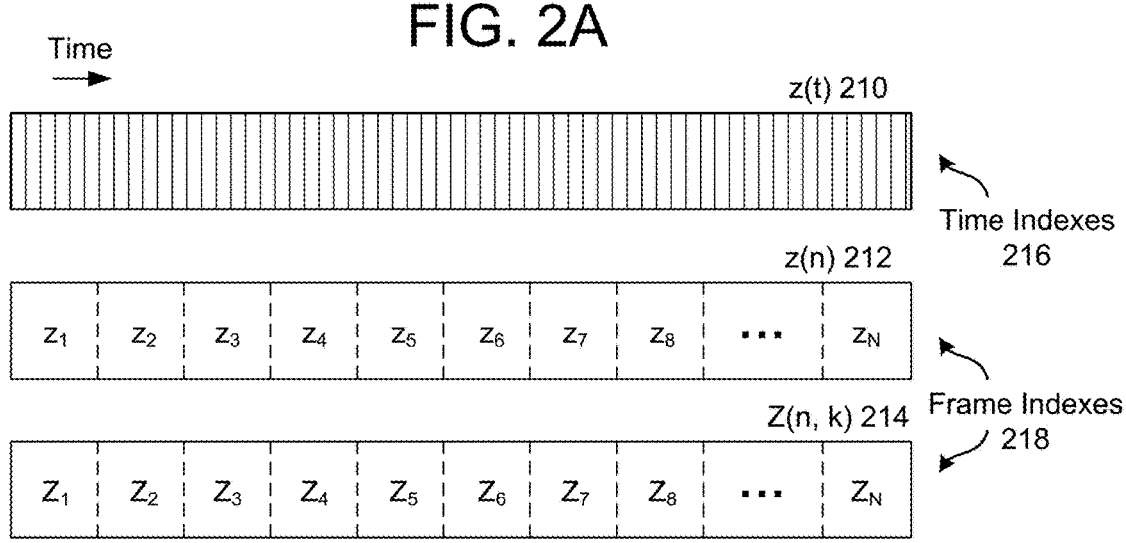
FIGS. 2A-2C illustrate examples of frame indexes, tone indexes, and channel indexes.
Figure 2B:
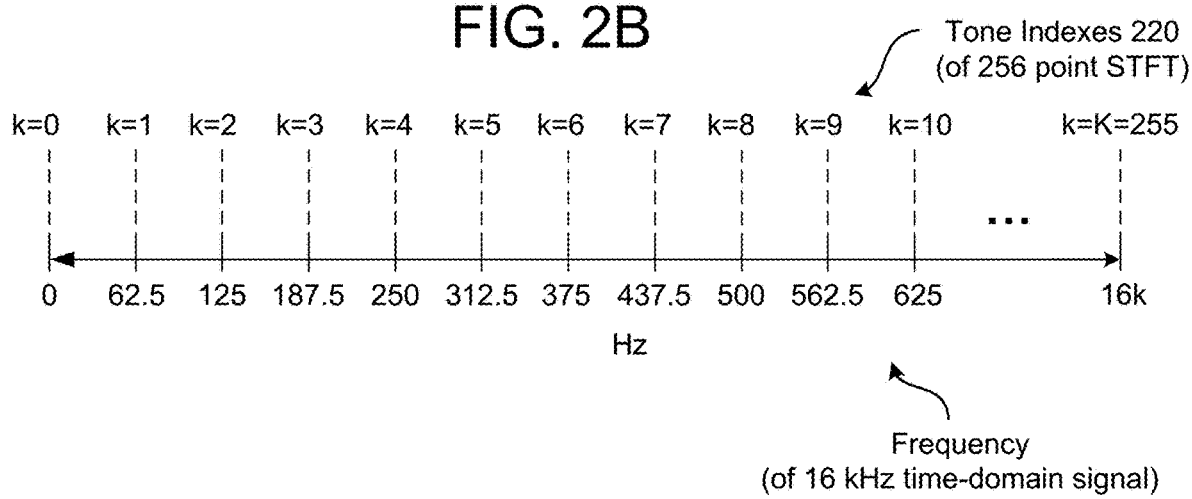
Figure 2C:
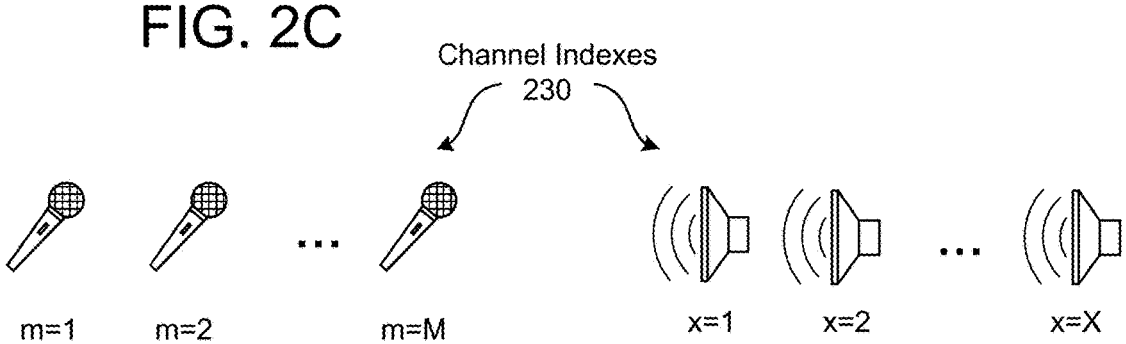

FIGS. 2A-2C illustrate examples of frame indexes, tone indexes, and channel indexes. As described above, the device 110 may generate microphone audio data z(t) using microphones 112. For example, a first microphone 112a may generate first microphone audio data $z_1(t)$ in a time domain, a second microphone 112b may generate second microphone audio data $z_2(t)$ in the time domain, and so on. As illustrated in FIG. 2A, a time domain signal may be represented as microphone audio data z(t) 210, which is comprised of a sequence of individual samples of audio data. Thus, z(t) denotes an individual sample that is associated with a time t.

While the microphone audio data z(t) 210 is comprised of a plurality of samples, in some examples the device 110 may group a plurality of samples and process them together. As illustrated in FIG. 2A, the device 110 may group a number of samples together in a frame (e.g., audio frame) to generate microphone audio data z(n) 212. As used herein, a variable z(n) corresponds to the time-domain signal and identifies an individual frame (e.g., fixed number of samples s) associated with a frame index n.

Additionally or alternatively, the device 110 may convert microphone audio data z(n) 212 from the time domain to the frequency domain or subband domain. For example, the device 110 may perform Discrete Fourier Transforms (DFTs) (e.g., Fast Fourier transforms (FFTs), short-time Fourier Transforms (STFTs), and/or the like) to generate microphone audio data Z(n, k) 214 in the frequency domain or the subband domain. As used herein, a variable Z(n, k) corresponds to the frequency-domain signal and identifies an individual frame associated with frame index n and tone index k. As illustrated in FIG. 2A, the microphone audio data z(t) 210 corresponds to time indexes 216, whereas the microphone audio data z(n) 212 and the microphone audio data Z(n, k) 214 corresponds to frame indexes 218.

While FIG. 2A illustrates examples of the device 110 converting between microphone audio data z(t) 210 (e.g., time domain signal comprising individual samples), microphone audio data z(n) 212 (e.g., time domain signal comprising audio frames), and microphone audio data Z(n, k) 214 (e.g., frequency domain or subband domain signal), the disclosure is not limited thereto and these concepts may be applied to other audio signals without departing from the disclosure. For example, the device 110 may convert between reference audio data x(t) (e.g., time domain signal comprising individual samples), reference audio data x(n) (e.g., time domain signal comprising audio frames), and reference audio data X(n, k) (e.g., frequency domain or subband domain signal) without departing from the disclosure. Similarly, the device 110 may generate an output signal OUT(n, k) in the frequency or subband domain and then convert to the time domain to generate output signal out(n) or out(t) without departing from the disclosure.

A Fast Fourier Transform (FFT) is a Fourier-related transform used to determine the sinusoidal frequency and phase content of a signal, and performing FFT produces a one-dimensional vector of complex numbers. This vector can be used to calculate a two-dimensional matrix of frequency magnitude versus frequency. In some examples, the system 100 may perform FFT on individual frames of audio data and generate a one-dimensional and/or a two-dimensional matrix corresponding to the microphone audio data Z(n). However, the disclosure is not limited thereto and the system 100 may instead perform short-time Fourier transform (STFT) operations without departing from the disclosure. A short-time Fourier transform is a Fourier-related transform used to determine the sinusoidal frequency and phase content of local sections of a signal as it changes over time.

Using a Fourier transform, a sound wave such as music or human speech can be broken down into its component "tones" of different frequencies, each tone represented by a sine wave of a different amplitude and phase. Whereas a time-domain sound wave (e.g., a sinusoid) would ordinarily be represented by the amplitude of the wave over time, a frequency domain representation of that same waveform comprises a plurality of discrete amplitude values, where each amplitude value is for a different tone or "bin." So, for example, if the sound wave consisted solely of a pure sinusoidal 1 kHz tone, then the frequency domain representation would consist of a discrete amplitude spike in the bin containing 1 kHz, with the other bins at zero. In other words, each tone "k" is a frequency index (e.g., frequency bin).

FIG. 2A illustrates an example of time indexes 216 (e.g., microphone audio data z(t) 210) and frame indexes 218 (e.g., microphone audio data z(n) 212 in the time domain and microphone audio data Z(n, k) 216 in the frequency domain or subband domain). For example, the system 100 may apply FFT processing to the time-domain microphone audio data z(n) 212, producing the frequency-domain microphone audio data Z(n,k) 214, where the tone index "k" (e.g., frequency index) ranges from 0 to K and "n" is a frame index ranging from 0 to N. As illustrated in FIG. 2A, the history of the values across iterations is provided by the frame index "n", which ranges from 1 to N and represents a series of samples over time.

FIG. 2B illustrates an example of performing a K-point FFT on a time-domain signal. As illustrated in FIG. 2B, if a 256-point FFT is performed on a 16 kHz time-domain signal, the output is 256 complex numbers, where each complex number corresponds to a value at a frequency in increments of 16 kHz/256, such that there is 62.5 Hz between points, with point 0 corresponding to 0 Hz and point 255 corresponding to 16 kHz. As illustrated in FIG. 2B, each tone index 220 in the 256-point FFT corresponds to a frequency range (e.g., subband) in the 16 kHz time-domain signal. While FIG. 2B illustrates the frequency range being divided into 256 different subbands (e.g., tone indexes), the disclosure is not limited thereto and the system 100 may divide the frequency range into K different subbands or frequency bins (e.g., K indicates an FFT size) without departing from the disclosure. While FIG. 2B illustrates the tone index 220 being generated using a Fast Fourier Transform (FFT), the disclosure is not limited thereto. Instead, the tone index 220 may be generated using Short-Time Fourier Transform (STFT), generalized Discrete Fourier Transform (DFT) and/or other transforms known to one of skill in the art (e.g., discrete cosine transform, non-uniform filter bank, etc.).

The system 100 may include multiple microphones 112, with a first channel (m=1) corresponding to a first microphone 112a, a second channel (m=2) corresponding to a second microphone 112b, and so on until an M-th channel (m=M) that corresponds to microphone 112M. FIG. 2C illustrates channel indexes 230 including a plurality of channels from channel m1 to channel M. While many drawings illustrate two channels (e.g., two microphones 112), the disclosure is not limited thereto and the number of channels may vary. For the purposes of discussion, an example of system 100 includes "M" microphones 112 (M>1) for hands free near-end/far-end distant speech recognition applications.

Similarly, the system 100 may include multiple loudspeakers 114, with a first channel (x=1) corresponding to a first loudspeaker 114a, a second channel (x=2) corresponding to a second loudspeaker 114b, and so on until an X-th channel (x=X) that corresponds to loudspeaker 114X. FIG. 2C illustrates channel indexes 230 also including a plurality of reference channels from channel x1 to channel X. For ease of illustration, the following disclosure may refer to a single reference channel, but the disclosure is not limited thereto and the system 100 may modify the techniques described herein based on any number of reference channels without departing from the disclosure.

As described above, while FIG. 2A is described with reference to the microphone audio data z(t), the disclosure is not limited thereto and the same techniques apply to the playback audio data x(t) without departing from the disclosure. Thus, playback audio data x(t) indicates a specific time index t from a series of samples in the time-domain, playback audio data x(n) indicates a specific frame index n from series of frames in the time-domain, and playback audio data X(n, k) indicates a specific frame index n and frequency index k from a series of frames in the frequency-domain.

Prior to converting the microphone audio data z(n) and the playback audio data x(n) to the frequency-domain, the device 110 may first perform time-alignment to align the playback audio data x(n) with the microphone audio data z(n). For example, due to nonlinearities and variable delays associated with sending the playback audio data x(n) to the loudspeaker(s) 114 (e.g., especially if using a wireless connection), the playback audio data x(n) is not synchronized with the microphone audio data z(n). This lack of synchronization may be due to a propagation delay (e.g., fixed time delay) between the playback audio data x(n) and the microphone audio data z(n), clock jitter and/or clock skew (e.g., difference in sampling frequencies between the device 110 and the loudspeaker(s) 114), dropped packets (e.g., missing samples), and/or other variable delays.

To perform the time alignment, the device 110 may adjust the playback audio data x(n) to match the microphone audio data z(n). For example, the device 110 may adjust an offset between the playback audio data x(n) and the microphone audio data z(n) (e.g., adjust for propagation delay), may add/subtract samples and/or frames from the playback audio data x(n) (e.g., adjust for drift), and/or the like. In some examples, the device 110 may modify both the microphone audio data and the playback audio data in order to synchronize the microphone audio data and the playback audio data. However, performing nonlinear modifications to the microphone audio data results in first microphone audio data associated with a first microphone to no longer be synchronized with second microphone audio data associated with a second microphone. Thus, the device 110 may instead modify only the playback audio data so that the playback audio data is synchronized with the first microphone audio data.

As described above, room reverberation is a detrimental factor that negatively impacts audio quality for hands-free voice communication systems. For example, a user 10 of a local device 110 may establish a communication session with another device, where digitized speech signals are compressed, packetized, and transmitted via the network(s) 199. One technique for establishing the communication session involves Voice over Internet Protocol (VoIP), although the disclosure is not limited thereto. During the communication session, a large amount of reverberation is harmful to communication (e.g., reduces an audio quality), as the reverberation lowers intelligibility and makes the speech sound "far" and "hollow." The reverberation is caused by walls and other hard surfaces in an environment of the device 110 (e.g., inside a room) creating multiple reflections. These reflections can be classified as early and late depending on a time-of-arrival associated with an individual reflection. Early reflections typically do not impact the audio quality, but late reflections may decrease the audio quality.

A dereverberation algorithm suppresses the late reverberation in the speech signal, providing an enhanced listening experience to the users during the communication session. However, applying a real-time dereverberation algorithm and integrating it into a voice processing pipeline may affect a performance of other components within the voice processing pipeline. For example, complications arise when the dereverberator affects the performance of components such as the NR component 124 configured to perform noise reduction processing.

To reduce the impact of applying dereverberation processing, the device 110 may modify the operation of other components in the voice processing pipeline and/or may tune dereverberator parameters associated with the dereverberation processing. However, tuning the dereverberator parameters may pose additional challenges, as accurate models to quantify a subjective perception of reverberant components in speech signals do not exist. In contrast, objective speech quality assessment methods (e.g., Perceptual Objective Listening Quality Analysis (POLQA)) do not take into account reverberation. Thus, they are not accurate and cannot be used to evaluate reverberant signals.

FIG. 3 illustrates example components for performing dereverberation according to examples of the present disclosure. As illustrated in FIG. 3, signals from two microphones 112a/112b are mapped to a subband domain by analysis filterbanks. For example, a first analysis filterbank 310 may convert a first microphone signal $z_0(n)$ in a time domain to a first microphone signal $Z_0(n,k)$ in a subband domain, while a second analysis filterbank 315 may convert a second microphone signal $z_1(n)$ in the time domain to a second microphone signal $Z_1(n,k)$ in the subband domain, where n is the frame index, k=0 to N/2 is the frequency index, and N is the number of subbands.

In some examples, the first analysis filterbank 310 and the second analysis filterbank 315 may include a uniform discrete Fourier transform (DFT) filterbank to convert the microphone signal $z(n)$ from the time domain into the sub-band domain (e.g., converting to the frequency domain and then separating different frequency ranges into a plurality of individual sub-bands). Therefore, the audio signal Z may incorporate audio signals corresponding to multiple different microphones as well as different sub-bands (i.e., frequency ranges) as well as different frame indices (i.e., time ranges). Thus, the audio signal from the mth microphone may be represented as $X_m(n, k)$, where n denotes the frame index and k denotes the sub-band index.

To summarize FIG. 3, the first microphone signal $Z_0(n,k)$ and the second microphone signal $Z_1(n,k)$ may be used to estimate a coherence in each frequency index (e.g., frequency bin or subband), which is used to calculate coherence-to-diffuse ratio (CDR) values (e.g., CDR data). The CDR values may be used to derive a masking gain (e.g., DER gain values) to suppress late reverberations. The DER gain values are calculated with an over-subtraction factor to assure no suppression in a non-reverberant room.

As illustrated in FIG. 3, a first power spectral density (PSD) estimation component 320 may receive the first microphone signal $Z_0(n,k)$ and may generate a first PSD estimate, while a second PSD estimation component 325 may receive the second microphone signal $Z_1(n,k)$ and may generate a second PSD estimate. The PSD estimation components 320/325 may generate the PSD estimates using the following equation:

$$S_{x_i}[n,k]=(1-\lambda)S_{x_i}[n-1,k]+\lambda \cdot |X_i[m,k]|^2, \; i=0,1, k=0 \text{ to } N/2 \quad [1]$$

where $\lambda \in (0, 1)$ denotes a forgetting factor and i is the microphone index.

The cross-PSD estimation component 330 may receive the first microphone signal $Z_0(n,k)$ and the second microphone signal $Z_1(n,k)$ and may calculate a cross-PSD estimate using the following equation:

$$S_{x_0 x_1}[n,k]=(1-\lambda)S_{x_0 x_1}[n-1,k]+\lambda \cdot X_0[m,k]X_1^*[m,k] \quad [2]$$

The first PSD estimation component 320 may send the first PSD estimate to an average component 335 and a coherence estimation component 340. Similarly, the second PSD estimation component 325 may send the second PSD estimate to the average component 335 and the coherence estimation component 340. The cross-PSD estimation component 330 may also send the cross-PSD estimate to the coherence estimation component 340. The average component 335 may determine an average between the first PSD estimate and the second PSD estimate, which will be used to generate the output signal OUT(n, k). However, the disclosure is not limited thereto, and in some examples the first PSD estimate or the second PSD estimate may be used to generate the output signal OUT(n, k) without departing from the disclosure.

The coherence estimation component 340 may receive the first PSD estimate, the second PSD estimate, and the cross-PSD estimate and may determine a coherence estimate using the equation below:

$$\Gamma_x[m, k] = \frac{S_{x_0 x_1}[m, k]}{\sqrt{S_{x_0}[m, k] S_{x_1}[m, k]}}, \; k = 0 \text{ to } N/2 \quad [3]$$

where $S_{x_0 x_1}[m, k]$ is the cross-PSD estimate, $S_{x_0}$ is the first PSD estimate, and $S_{x_1}$ is the second PSD estimate. The coherence estimation component 340 may send the coherence estimate to a coherence-to-diffuse ratio (CDR) estimation component 350.

The diffuse component specification component 345 may determine the coherence of diffuse components using the following equation:

$$\Gamma_{diff}[k] = sinc\left(\frac{2\pi f_s d}{N \cdot c} k\right), \; k = 0 \text{ to } N/2 \quad [4]$$

where $f_s$ is sampling frequency in Hertz (Hz), d is the distance between the sensors in meters (m), and c is the speed of sound in m/s.

The diffuse component specification component 345 may send the coherence of diffuse components to the CDR estimation component 350. Using the coherence estimate received from the coherence estimation component 340 and the coherence of diffuse components, the CDR estimation component 350 may generate a CDR estimate:

$$CDR[m, k] = \frac{\Gamma_{diff}\text{Re}\{\Gamma_x\} - |\Gamma_x|^2 - \sqrt{\Gamma_{diff}^2\text{Re}\{\Gamma_x\}^2 - \Gamma_{diff}^2|\Gamma_x|^2 + \Gamma_{diff}^2 - 2\Gamma_{diff}\text{Re}\{\Gamma_x\} + |\Gamma_x|^2}}{|\Gamma_x|^2 - 1} \quad [5]$$

The CDR estimation component 350 may send the CDR estimate to the gain calculation component 355, which may calculate the gain in each band as:

$$g[m, k] = \max\left(gmin, 1 - \sqrt{\frac{\mu}{CDR[m, k] + 1}}\right), k = 0 \text{ to } N/2 \quad [6]$$

where gmin is the minimum gain allowed and p is the over-subtraction factor.

The multiplier component 360 may use these calculated gains to mask the subband coefficients from the first channel:

$$X_0'[m,k] = g[m,k]X_0[m,k] \quad [7]$$

representing the dereverberated signal. A synthesis filterbank 370 may convert this dereverberated signal in the subband domain back to time domain to generate output signal 375.

Figure 4:
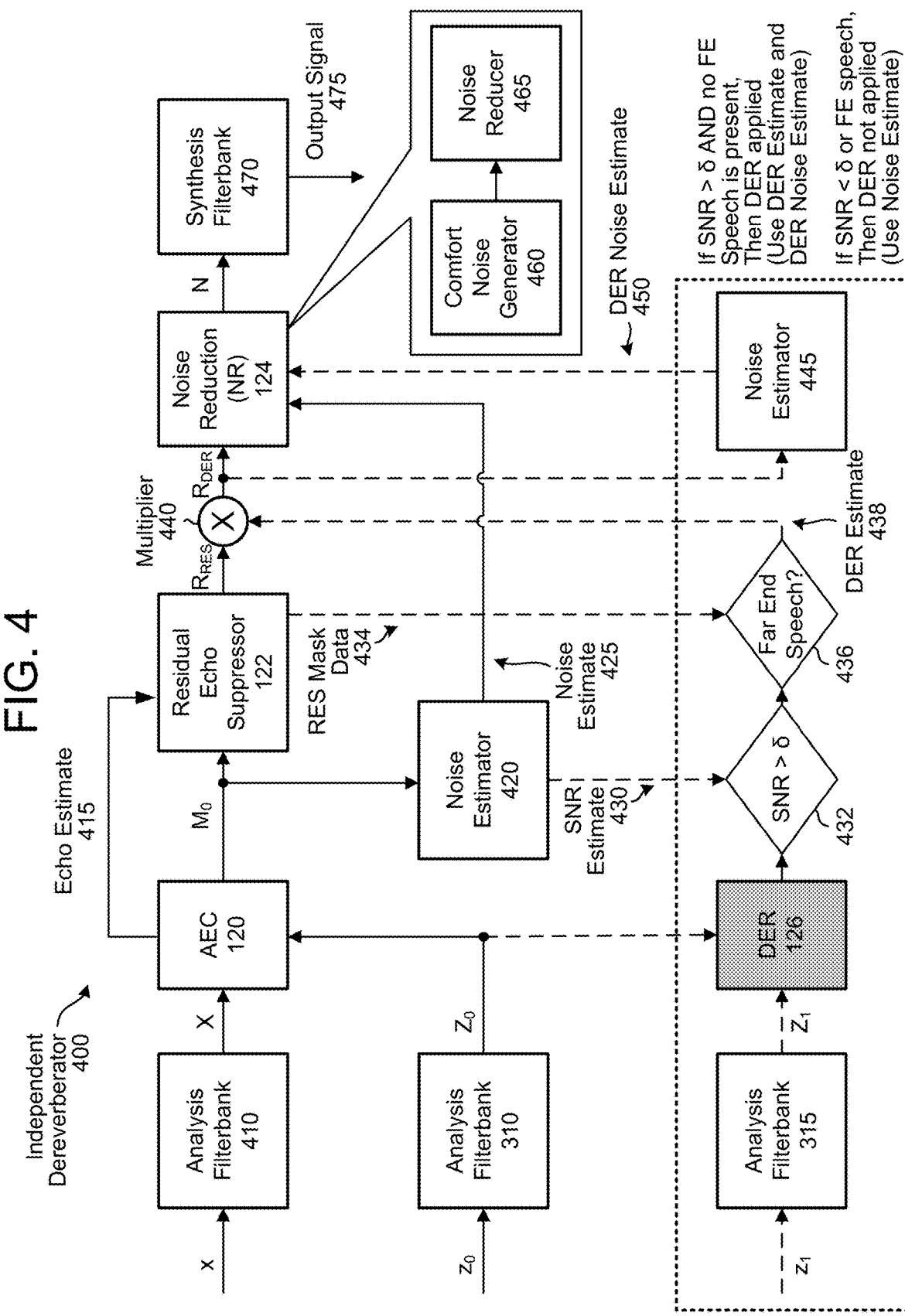
FIG. 4 illustrates example components for performing dereverberation within a voice processing pipeline according to examples of the present disclosure.

FIG. 4 illustrates example components for performing dereverberation within a voice processing pipeline according to examples of the present disclosure. As illustrated in FIG. 4, in some examples the device 110 may perform dereverberation using an independent dereverberator 400.

As described above with regard to FIG. 3, signals from two microphones 112a/112b are mapped to a subband domain by analysis filterbanks. For example, the first analysis filterbank 310 may convert the first microphone signal $z_0(n)$ in the time domain to the first microphone signal $Z_0(n,k)$ in the subband domain, while the second analysis filterbank 315 may convert the second microphone signal $z_1(n)$ in the time domain to the second microphone signal $Z_1(n,k)$ in the subband domain, where n is the frame index, k=0 to N/2 is the frequency index, and N is the number of subbands.

Similarly, a third analysis filterbank 410 may convert a reference signal x(n) in the time domain to a reference signal X(n,k) in the subband domain. In some examples, the third analysis filterbank 410 may include a uniform discrete Fourier transform (DFT) filterbank to convert the reference signal x(n) from the time domain into the sub-band domain (e.g., converting to the frequency domain and then separating different frequency ranges into a plurality of individual sub-bands). Therefore, the audio signal X may incorporate reference audio signals corresponding to one or more loudspeakers 114 as well as different sub-bands (i.e., frequency ranges) as well as different frame indices (i.e., time ranges). Thus, the audio signal associated with the xth loudspeaker 114 may be represented as $X_x(n, k)$, where n denotes the frame index and k denotes the sub-band index. While FIG. 4 illustrates an example using a single reference channel, the disclosure is not limited thereto and the number of reference signals may vary without departing from the disclosure.

An AEC component 120 may perform echo cancellation (e.g., AEC processing) to generate a first isolated signal $M_0(n, k)$. For example, the AEC component 120 may generate an echo estimate 415 using the reference signal X(n,k) and may subtract the echo estimate 415 from the first microphone signal $Z_0(n,k)$ to generate the first isolated signal $M_0(n, k)$. If the echo estimate 415 corresponds to the echo signal Y(n, k) represented in the first microphone signal $Z_0(n,k)$, the AEC component 120 may effectively remove the echo signal Y(n, k) and isolate the near-end speech S(n, k). The first isolated signal $M_0(n, k)$ generated by the AEC component 120 may be output to the Residual Echo Suppressor (RES) component 122, a noise estimator component 420, and a dereverberation (DER) component 126. The AEC component 120 may also output the echo estimate 415 to the RES component 122.

The noise estimator component 420 may use the first isolated signal $M_0(n, k)$ to determine a noise estimate 425 and a signal-to-noise ratio (SNR) estimate 430. The noise estimate 425 corresponds to an array of values (e.g., NoiseEstimate(n, k), such that a first noise estimate value corresponds to a first subband, a second noise estimate value corresponds to a second subband, and so on. In contrast, the SNR estimate 430 corresponds to a single SNR estimate value for an audio frame (e.g., SNR(n), such that the SNR estimate 430 does not change between subbands of the audio frame. The noise estimator 420 may send the noise estimate 425 to the NR component 124 and may send the SNR estimate 430 to the DER component 126.

The RES component 122 may perform residual echo suppression (RES) processing to the first isolated signal $M_0(n, k)$ to generate a first audio signal $R_{RES}(n, k)$. The RES component 122 may perform RES processing in order to suppress echo signals (or undesired audio) remaining in the first isolated signal $M_0(n, k)$. For example, the RES component 122 may calculate RES gains (not illustrated) based on the echo estimate 415 in order to apply additional attenuation. To illustrate an example, the RES component 122 may use the echo estimate 415 and/or the first isolated signal $M_0(n, k)$ to identify first subbands in which the AEC component 120 applied attenuation. The RES component 122 may then determine whether there are residual echo components represented in the first subbands of the first isolated signal $M_0(n, k)$ and may calculate the RES gains to perform residual echo suppression processing. For example, the RES component 122 may apply the RES gains to the first isolated signal $M_0(n, k)$ in order to generate the first audio signal $R_{RES}(n, k)$.

In some examples, the RES component 122 may vary an amount of RES processing based on current conditions, although the disclosure is not limited thereto. Additionally or alternatively, the RES component 122 may perform RES processing differently based on individual frequency indexes. For example, the RES component 122 may control an amount of gain applied to low frequency bands, which are commonly associated with speech.

As illustrated in FIG. 4, the RES component 122 may output the first audio signal $R_{RES}(n, k)$ to a multiplier component 440 and may also output RES mask data 434 to the DER component 126 and/or another component of the device 110. For example, the RES component 122 may output the RES mask data 434 to enable the device 110 to determine if far-end speech is present in the first isolated signal $M_0(n, k)$. If the device 110 determines that far-end speech is present (e.g., device 110 detects far-end single talk or double talk conditions), the device 110 may bypass dereverberation processing, whereas if the device 110 determines that far-end speech is not present (e.g., device 110 only detects near-end single talk conditions), the device 110 may perform dereverberation processing.

While not illustrated in FIG. 4, the RES component 122 may optionally output the RES gains. For example, the RES component 122 may output the RES gains to an Automatic Gain Control (AGC) component (which may also be referred to as adaptive gain control) that processes the output signal 475, although the disclosure is not limited thereto. In some examples, the RES gains may correspond to the RES mask data 434, although the disclosure is not limited thereto.

The DER component 126 may perform DER processing as described in greater detail above with regard to FIG. 3. For example, the DER component 126 may calculate CDR values using the first microphone signal $Z_0(n,k)$ and the second microphone signal $Z_1(n,k)$ and may use the CDR values to generate DER estimate 438. The DER estimate 438 may correspond to the DER gain values (e.g., DER gain data) described above, although the disclosure is not limited thereto.

The device 110 may use the SNR estimate 430 to determine (432) whether to perform DER processing or to bypass DER processing. For example, if the SNR estimate 430 does not satisfy a condition (e.g., is below a threshold value δ, such as 10 dB), the device 110 may skip DER processing and prioritize Noise Reduction (NR) processing instead. However, if the SNR estimate 430 satisfies the condition (e.g., is above the threshold value δ), the device 110 may perform DER processing. While FIG. 4 illustrates step 432 as a decision block, this determination may be made by the DER component 126, the noise estimator component 420, a separate bypass determination component (not illustrated), and/or other components included in the device 110.

Similarly, the device 110 may use the RES mask data 434 to determine (436) whether to perform DER processing or to bypass DER processing. For example, the RES component 122 may output the RES mask data 434 to enable the device 110 to determine if far-end speech is present in the first isolated signal $M_0(n, k)$. The device 110 may determine that far-end speech is present (e.g., device 110 detects far-end single talk or double talk conditions) if the RES mask data 434 does not satisfy a condition (e.g., average value is below a threshold value φ, such as 0.9). Due to the presence of the far-end speech, the device 110 may skip DER processing and prioritize Noise Reduction (NR) processing instead. However, the device 110 may instead determine that far-end speech is not present (e.g., device 110 only detects near-end single talk conditions) if the RES mask data 434 satisfies the condition (e.g., average value is above the threshold value φ). When the far-end speech is not present, the device 110 may perform DER processing. While FIG. 4 illustrates step 436 as a decision block, this determination may be made by the DER component 126, the RES component 122, a separate bypass determination component (not illustrated), and/or other components included in the device 110.

As illustrated in FIG. 4, the device 110 may determine whether to perform DER processing based on the SNR estimate 430 and the RES mask data 434. If the device 110 determines to perform DER processing (e.g., SNR>δ and far-end speech is not detected), the multiplier component 440 may receive the first audio signal $R_{RES}(n, k)$ and the DER estimate 438 generated by the DER component 126 and may generate a second audio signal $R_{DER}(n, k)$. For example, the multiplier component 440 may apply the DER estimate 438 to the first audio signal $R_{RES}(n, k)$ for individual frequency indexes to generate the second audio signal $R_{DER}(n, k)$. In this example, the multiplier component 440 may output the second audio signal $R_{DER}(n, k)$ to the NR component 124 and to a noise estimator component 445.

If the device 110 determines to perform DER processing (e.g., doesn't decide to bypass DER processing), the noise estimator component 445 may be configured to determine an updated noise estimate. For example, the noise estimator component 445 may generate a DER noise estimate 450 based on the second audio signal $R_{DER}(n, k)$ (e.g., after applying the DER gain values). Similar to the noise estimate 425 described above, the DER noise estimate 450 corresponds to an array of values (e.g., NoiseEstimate(n, k), such that a first noise estimate value corresponds to a first subband, a second noise estimate value corresponds to a second subband, and so on. The device 110 may use the DER noise estimate 450 to perform NR processing, as described in greater detail below, to avoid over suppressing the noise. For example, as DER processing removes some diffuse noise, the original noise estimate 425 will be higher than the DER noise estimate 450, resulting in more aggressive NR processing.

If the device 110 determines not to perform DER processing (e.g., decides to bypass DER processing), the multiplier component 440 may effectively pass the first audio signal $R_{RES}(n, k)$ to the NR component 124 without applying the DER estimate 438. In this example, the noise estimator 445 does not generate the DER noise estimate 450 and the NR component 124 performs NR processing using the original noise estimate 425.

The NR component 124 may be configured to perform NR processing to generate an output signal OUT(n, k) in the subband domain. For example, if the device 110 determines not to perform DER processing, the NR component 124 may perform NR processing to the first audio signal $R_{RES}(n, k)$ using the noise estimate 425. In contrast, if the device 110 determines to perform DER processing, the NR component 124 may perform NR processing to the second audio signal $R_{DER}(n, k)$ using the DER noise estimate 450 received from the noise estimator component 445. Thus, the NR component 124 may control an amount of NR processing differently depending on whether the device 110 performs DER processing or not.

As illustrated in FIG. 4, the NR component 124 may include a comfort noise generator component 460 and/or a noise reducer component 465. The comfort noise generator component 460 and/or the noise reducer component 465 may use either the noise estimate 425 (e.g., SNR<δ) or the DER noise estimate 450 (e.g., SNR>δ) to generate the output signal OUT(n, k).

As illustrated in FIG. 4, the NR component 124 may generate the output signal OUT(n, k) and send the output signal OUT(n, k) to the synthesis filterbank 470. The synthesis filterbank 470 may receive the output signal OUT(n, k) from the NR component 124. The output signal OUT(n, k) may be in the subband domain and the synthesis filterbank 470 may convert the output signal OUT(n, k) from the subband domain to the time domain to generate output signal out(t) 475. For example, the output signal OUT(n, k) in the subband domain may include a plurality of separate sub-bands (e.g., individual frequency bands) and the synthesis filterbank 470 may combine the plurality of subbands to generate the output signal out(t) 475 in the time domain.

While not illustrated in FIG. 4, in some examples the device 110 may include an automatic gain control (AGC) component (not illustrated) (which may also be referred to as adaptive gain control) and/or a dynamic range compression (DRC) component (not illustrated) (which may also be referred to as dynamic range control) to generate the output signal without departing from the disclosure. The device 110 may apply the noise reduction, the AGC component, and/or the DRC component using any techniques known to one of skill in the art. In some examples, the device 110 may perform additional processing in the time domain using the RES gain values, although the disclosure is not limited thereto. For example, the device 110 may use the RES gain values to estimate an amount of noise represented in the output signal and perform additional processing based on the estimated amount of noise.

Figure 5:
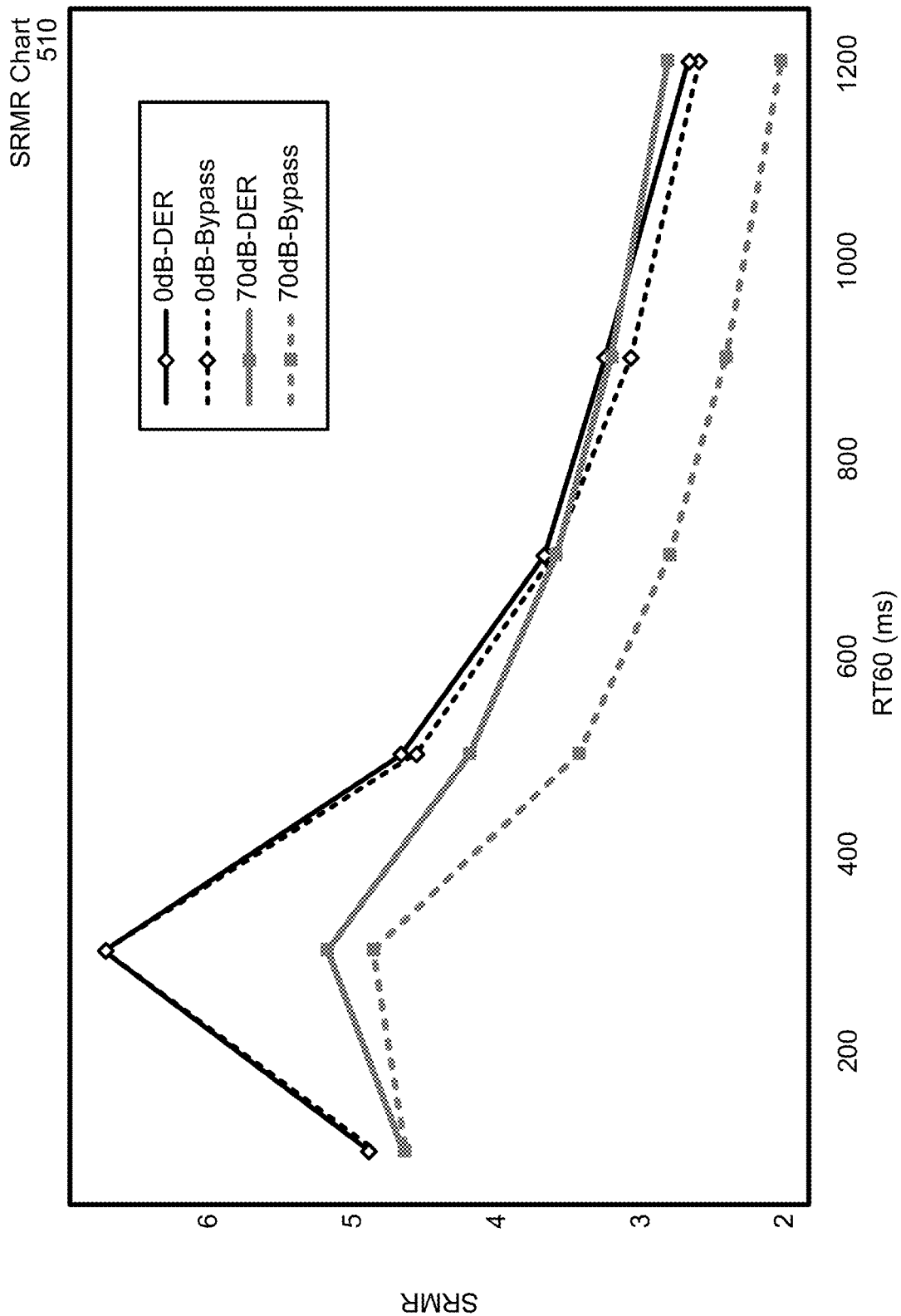
FIG. 5 illustrates a chart representing reduction in reverberation according to examples of the present disclosure.

FIG. 5 illustrates a chart representing reduction in reverberation according to examples of the present disclosure. The speech to reverberation modulation ratio (SRMR) chart 510 represents a magnitude of SRMR values for different configurations at different reverberation time values corresponding to 60 dB drop (e.g., RT60 values). Thus, the horizontal axis (e.g., x axis) indicates a RT60 value, while the vertical axis (e.g., y axis) indicates a corresponding SRMR value.

As illustrated in FIG. 5, the SRMR chart 510 includes simulations corresponding to four different configurations. The SRMR score improved in most of the simulations, with the SRMR chart 510 representing the evaluation for a first simulation corresponding to clean speech (e.g., high SNR value) and a second simulation corresponding to a noisy environment (e.g., SNR value of 0 dB). For example, the dashed black line (with diamonds) represents a reverberated signal (e.g., bypassing DER processing) when an SNR value is equal to 0 dB (e.g., noisy conditions), whereas the solid black line (with diamonds) represents the dereverberated signal (e.g., after dereverberation is performed) when the SNR value is equal to 0 dB. Similarly, the dashed gray line (with squares) represents a reverberated signal (e.g., bypassing DER processing) when the SNR value is high (e.g., clean speech), whereas the solid gray line (with squares) represents the dereverberated signal when the SNR value is high.

Figure 6:
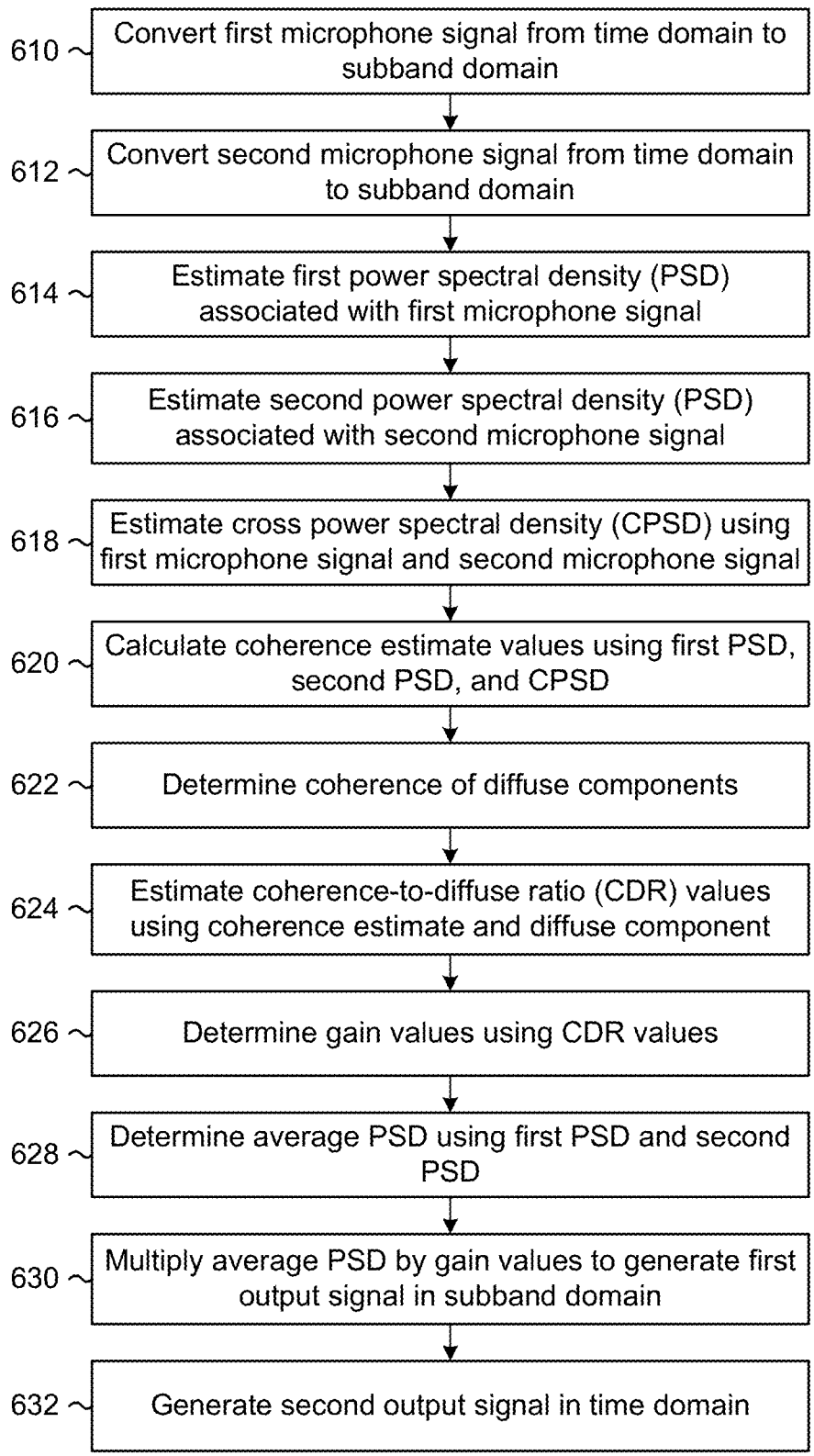
FIG. 6 is a flowchart conceptually illustrating an example method for performing dereverberation according to embodiments of the present disclosure.

FIG. 6 is a flowchart conceptually illustrating an example method for performing dereverberation according to embodiments of the present disclosure. As illustrated in FIG. 6, the device 110 may convert (610) a first microphone signal from a time domain to a subband domain and may convert (612) a second microphone signal from the time domain to the subband domain. For example, as described above with regard to FIG. 3, the first analysis filterbank 310 may convert the first microphone signal $z_0(n)$ in the time domain to the first microphone signal $Z_0(n,k)$ in the subband domain, while the second analysis filterbank 315 may convert the second microphone signal $z_1(n)$ in the time domain to the second microphone signal $Z_1(n,k)$ in the subband domain, where n is the frame index, k=0 to N/2 is the frequency index, and N is the number of subbands.

The device 110 may estimate (614) a first power spectral density (PSD) function associated with the first microphone signal and may estimate (616) a second PSD function associated with the second microphone signal. For example, the PSD functions may describe a power present in the first and second microphone signals as a function of frequency or subband. The device 110 may estimate the PSD functions using Equation [1] described above. For example, the first power spectral density (PSD) estimation component 320 may receive the first microphone signal $Z_0(n,k)$ and may generate the first PSD function, while the second PSD estimation component 325 may receive the second microphone signal $Z_1(n,k)$ and may generate the second PSD function.

The device 110 may estimate (618) a cross power spectral density (CPSD) function using the first microphone signal and the second microphone signal. For example, the cross-PSD estimation component 330 may receive the first microphone signal $Z_0(n,k)$ and the second microphone signal $Z_1(n,k)$ and may calculate the cross-PSD function using Equation [2] described above.

The device 110 may calculate (620) coherence estimate values using the first PSD function, the second PSD function, and the CPSD function. For example, the coherence estimation component 340 may receive the first PSD function, the second PSD function, and the cross-PSD function and may determine a coherence estimate using Equation [3] described above. The device 110 may determine (622) a coherence estimate of the diffuse components. For example, the diffuse component specification component 345 may determine the coherence of diffuse components using Equation [4] described above.

The device 110 may estimate (624) coherence-to-diffuse ratio (CDR) values using the coherence estimate values and the coherence estimate of the diffuse components. For example, the CDR estimation component 350 may generate the CDR values using the coherence estimate and the coherence of diffuse components, as described above with regard to Equation [5]. The device 110 may then determine (626) gain values using the CDR values. For example, the gain calculation component 355 may calculate the gain in each band using Equation [6] described above.

The device 110 may determine (628) an average PSD function using the first PSD function and the second PSD function. For example, the average component 335 may determine an average between the first PSD function and the second PSD function, and the device 110 may use the average PSD function to generate the output signal. However, the disclosure is not limited thereto, and in some examples the first PSD estimate or the second PSD estimate may be used to generate the output signal OUT(n, k) without departing from the disclosure. Thus, the device 110 may multiply (630) the average PSD function by the gain values to generate a first output signal in the subband domain, and may generate (632) a second output signal in the time domain. For example, the multiplier component 360 may use the gain values to mask the subband coefficients from the average PSD function. The synthesis filterbank 370 may convert the first output signal in the subband domain to the second output signal in the time domain.

Figure 7:
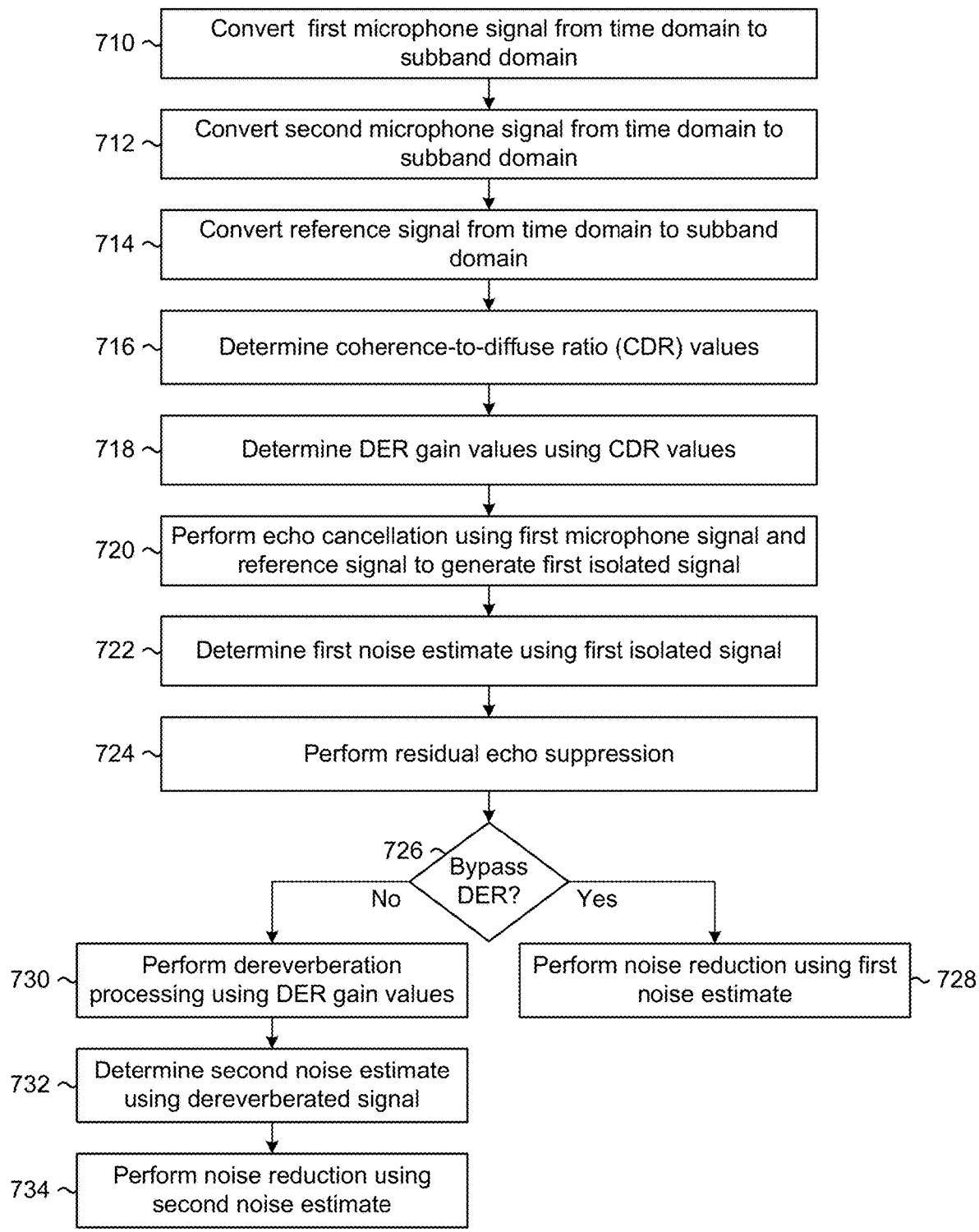
FIG. 7 is a flowchart conceptually illustrating an example method for performing dereverberation within a voice processing pipeline according to embodiments of the present disclosure.

FIG. 7 is a flowchart conceptually illustrating an example method for performing dereverberation within a voice processing pipeline according to embodiments of the present disclosure. As illustrated in FIG. 7, the device 110 may convert (710) a first microphone signal from the time domain to the subband domain and may convert (712) a second microphone signal from the time domain to the subband domain. For example, the first analysis filterbank 310 may convert the first microphone signal $z_0(n)$ in the time domain to the first microphone signal $Z_0(n,k)$ in the subband domain, while the second analysis filterbank 315 may convert the second microphone signal $z_1(n)$ in the time domain to the second microphone signal $Z_1(n,k)$ in the subband domain, where n is the frame index, k=0 to N/2 is the frequency index, and N is the number of subbands.

The device 110 may then convert (714) a reference signal from the time domain to the subband domain. For example, the third analysis filterbank 410 may convert the reference signal x(n) in the time domain to the reference signal X(n,k) in the subband domain. In some examples, the third analysis filterbank 410 may include a uniform discrete Fourier transform (DFT) filterbank to convert the reference signal x(n) from the time domain into the sub-band domain (e.g., converting to the frequency domain and then separating different frequency ranges into a plurality of individual sub-bands). Therefore, the audio signal X may incorporate reference audio signals corresponding to one or more loudspeakers 114 as well as different sub-bands (i.e., frequency ranges) as well as different frame indices (i.e., time ranges). Thus, the audio signal associated with the xth loudspeaker 114 may be represented as $X_x(n, k)$, where n denotes the frame index and k denotes the sub-band index.

The device 110 may determine (716) coherence-to-diffuse ratio (CDR) values and determine (718) DER gain values using the CDR values. For example, the DER component 126 may calculate CDR values using the first isolated signal $M_0(n, k)$ and the second isolated signal $M_1(n, k)$ and may use the CDR values to generate a DER estimate 438, as described in greater detail above with regard to FIG. 3.

The device 110 may perform (720) echo cancellation using the first microphone signal and the reference signal to generate a first isolated signal. For example, the AEC component 120 may perform echo cancellation (e.g., AEC processing) to generate a first isolated signal $M_0(n, k)$ by subtracting the reference signal $X(n,k)$ from the first microphone signal $Z_0(n,k)$.

Using the first isolated signal $M_0(n, k)$, the device 110 may determine (722) a first noise estimate. For example, the noise estimator component 420 may use the first isolated signal $M_0(n, k)$ to determine the noise estimate 425 and a signal-to-noise ratio (SNR) estimate 430.

The device 110 may perform (724) residual echo suppression using the RES component 122 to generate a first audio signal $R_{RES}(n, k)$. For example, the RES component 122 may perform RES processing in order to suppress echo signals (or undesired audio) remaining in the first isolated signal $M_0(n, k)$. In some examples, the RES component 122 may vary an amount of RES processing based on current conditions, although the disclosure is not limited thereto. Additionally or alternatively, the RES component 122 may perform RES processing differently based on individual frequency indexes. For example, the RES component 122 may control an amount of gain applied to low frequency bands, which are commonly associated with speech.

The device 110 may determine (726) whether to bypass dereverberation processing based on current system conditions, as described below with regard to FIGS. 9-11B. For example, the device 110 may determine to bypass dereverberation processing when the SNR estimate 430 is below a first threshold value, when an average of the CDR values is above a second threshold value, when far-end speech is detected, and/or the like, although the disclosure is not limited thereto.

If the device 110 determines to bypass the dereverberation processing, the device 110 may perform (728) noise reduction using the first noise estimate. If the device 110 determines not to bypass the dereverberation processing, the device 110 may perform (730) dereverberation processing using the DER gain values to generate a second audio signal $R_{DER}(n, k)$. For example, the multiplier component 440 may receive the first audio signal $R_{RES}(n, k)$ and the DER estimate 438 generated by the DER component 126 and may generate the second audio signal $R_{DER}(n, k)$. Thus, the multiplier component 440 may multiply the first audio signal $R_{RES}(n, k)$ by the DER estimate 438 for individual frequency indexes to generate the second audio signal $R_{DER}(n, k)$.

After performing dereverberation processing, the device 110 may determine (732) a second noise estimate using the second audio signal $R_{DER}(n, k)$ (e.g., dereverberated signal) and may perform (734) noise reduction using the second noise estimate. For example, the noise estimator component 445 may be configured to determine a DER noise estimate 450 (e.g., second noise estimate) based on the second audio signal $R_{DER}(n, k)$ (e.g., after applying the DER gain values). The device 110 may use the DER noise estimate 450 to perform NR processing in order to avoid over suppressing the noise. For example, as the dereverberation processing removes some diffuse noise, the original noise estimate 425 (e.g., first noise estimate) will be higher than the DER noise estimate 450 (e.g., second noise estimate), resulting in more aggressive NR processing.

Figure 8:
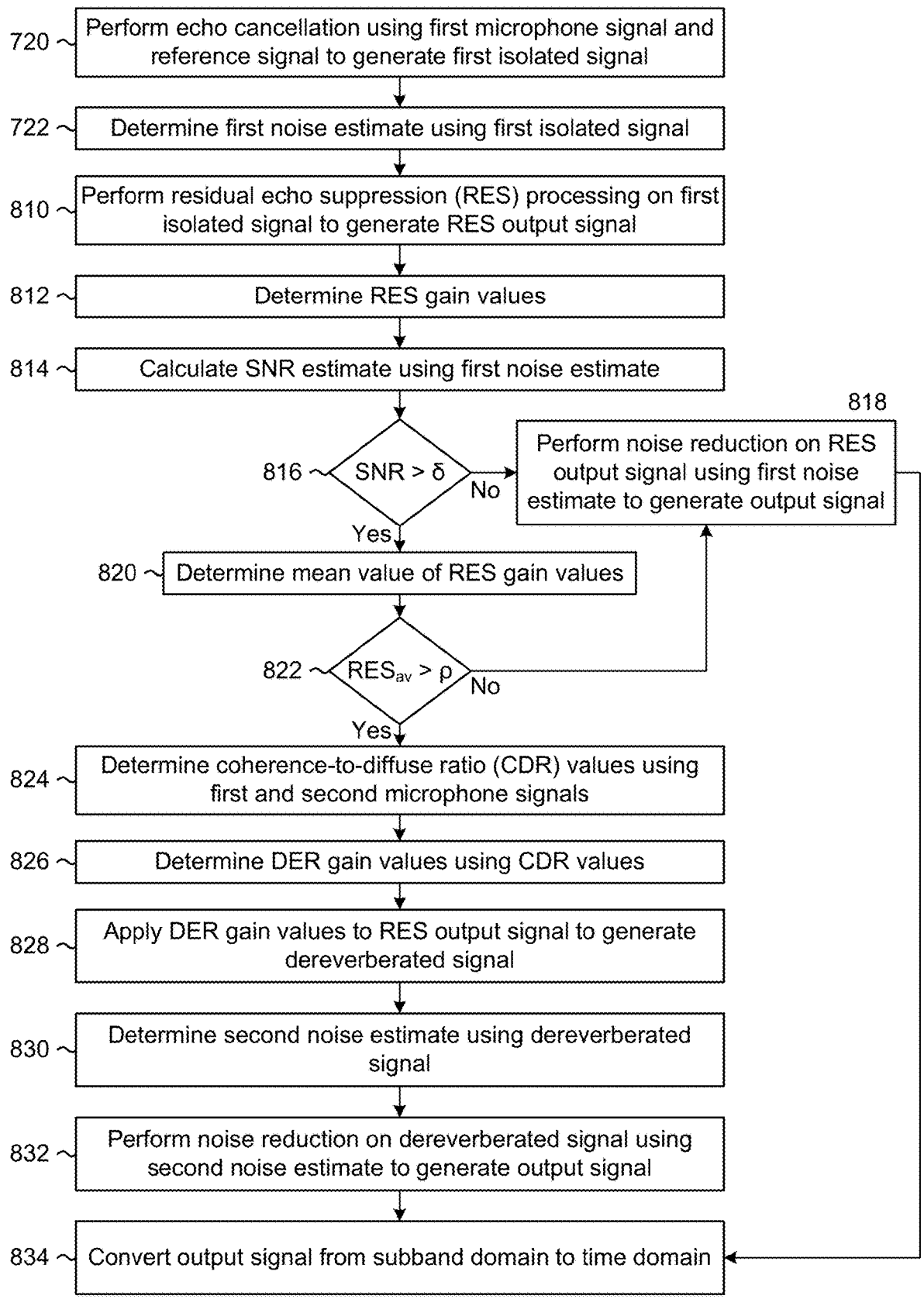
FIG. 8 is a flowchart conceptually illustrating an example method for performing dereverberation within a voice processing pipeline according to embodiments of the present disclosure.

FIG. 8 is a flowchart conceptually illustrating an example method for performing dereverberation within a voice processing pipeline according to embodiments of the present disclosure. As illustrated in FIG. 8, the device 110 may perform (720) echo cancellation using the first microphone signal and the reference signal to generate a first isolated signal and may determine (722) the first noise estimate, as described in greater detail above with regard to FIG. 7.

The device 110 may perform (810) residual echo suppression (RES) processing on the first isolated signal to generate a RES output signal. For example, the RES component 122 may perform residual echo suppression (RES) processing to the first isolated signal $M_0(n, k)$ to generate the first audio signal $R_{RES}(n, k)$ (e.g., RES output signal). The RES component 122 may perform RES processing in order to suppress echo signals (or undesired audio) remaining in the first isolated signal $M_0(n, k)$. As part of performing RES processing, the device 110 may determine (812) RES gain values corresponding to the RES processing.

The device 110 may calculate (814) a signal-to-noise-ratio (SNR) estimate using the first noise estimate. For example, the noise estimator component 420 may use the first isolated signal $M_0(n, k)$ to determine a noise estimate 425 and a signal-to-noise ratio (SNR) estimate 430.

The device 110 may determine (816) whether the SNR estimate is above a first threshold value $\delta$. If the SNR estimate is below the first threshold value $\delta$, the device 110 may perform (818) noise reduction on the RES output signal using the first noise estimate to generate an output signal $OUT(n, k)$. For example, the device 110 may skip the dereverberation processing and apply normal noise reduction using the first noise estimate determined in step 722.

If the SNR estimate is above the first threshold value $\delta$, however, the device 110 may determine (820) an average value $RES_{av}$ (e.g., mean value) of the RES gain values and may determine (822) whether the average value $RES_{av}$ is above a second threshold value $\rho$ (e.g., 0.9, although the disclosure is not limited thereto). Thus, the device 110 may use the average value $RES_{av}$ as a proxy to determine if far-end speech is present in the first isolated signal. For example, a first average value $RES_{av1}$ close to a value of 1.0 (e.g., above the second threshold value $\rho$) may indicate that far-end speech is not present in the first isolated signal (e.g., the first isolated signal is not being suppressed during RES processing). In contrast, a second average value $RES_{av2}$ that is not close to a value of 1.0 (e.g., below the second threshold value $\rho$) may indicate that far-end speech is present in the first isolated signal (e.g., at least a portion of the first isolated signal is being suppressed during RES processing). If the average value $RES_{av}$ is below the second threshold value $\rho$, the device 110 may perform (818) noise reduction on the RES output signal using the first noise estimate to generate an output signal $OUT(n, k)$.

If the average value $RES_{av}$ is above the second threshold value $\rho$, the device 110 may determine (824) coherence-to-diffuse ratio (CDR) values using the first and second microphone signals, may determine (826) DER gain values using the CDR values, and may apply (828) the DER gain values to the RES output signal to generate a dereverberated signal. For example, the DER component 126 may calculate CDR values using the first microphone signal $Z_0(n, k)$ and the second microphone signal $Z_1(n, k)$, may use the CDR values to generate a DER estimate 438, and may apply the DER estimate 438 to the RES output signal generated by the RES component 122. As described above with regard to FIG. 4, the multiplier component 440 may receive the first audio signal $R_{RES}(n, k)$ and the DER estimate 438 generated by the DER component 126 and may generate the second audio signal $R_{DER}(n, k)$. Thus, the multiplier component 440 may apply the DER estimate 438 to the first audio signal $R_{RES}(n, k)$ for individual frequency indexes to generate the second audio signal $R_{DER}(n, k)$.

While not illustrated in FIG. 8, in some examples the device 110 may determine to bypass dereverberation processing based on the CDR values, as described in greater detail below with regard to FIGS. 11A-11B. For example, if an average of the CDR values is above a third threshold value φ, this may indicate non-reverberant conditions and the device 110 may bypass dereverberation processing (e.g., skip to step 818 and perform noise reduction using the first noise estimate). In contrast, if the average of the CDR values is below the third threshold value φ, this may indicate reverberant conditions and the device 110 may perform dereverberation processing as illustrated in FIG. 8.

After performing dereverberation processing, the device 110 may determine (830) a second noise estimate using the dereverberated signal (e.g., second audio signal $R_{DER}(n, k)$) and may perform (832) noise reduction on the dereverberated signal using the second noise estimate to generate a first output signal OUT(n, k). For example, the noise estimator component 445 may be configured to determine a DER noise estimate 450 (e.g., second noise estimate) based on the second audio signal $R_{DER}(n, k)$ (e.g., after applying the DER gain values). The device 110 may use the DER noise estimate 450 to perform NR processing in order to avoid over suppressing the noise. For example, as the dereverberation processing removes some diffuse noise, the original noise estimate 425 (e.g., first noise estimate) will be higher than the DER noise estimate 450 (e.g., second noise estimate), resulting in more aggressive NR processing.

While not illustrated in FIG. 8, in some examples the device 110 may perform hybrid dereverberation processing instead of full dereverberation processing. Thus, the device 110 may transition between bypassing dereverberation processing and performing full dereverberation processing by applying attenuated DER gain values during a transition period. For example, the device 110 may use a linear transition to adjust a relative strength of noise reduction (NR) gain values and the DER gain values during the transition period.

To illustrate an example, the device 110 may perform hybrid dereverberation processing based on the SNR estimate. For example, the device 110 may transition from bypassing dereverberation processing entirely to applying DER gain values that are attenuated by a first weight based on the SNR estimate. The first weight increases as the SNR estimate increases, resulting in more dereverberation processing being performed, until the first weight is equal to a value of one and the device 110 applies full dereverberation processing. To maintain a consistent output signal during the transition period, the device 110 may attenuate the NR gain values by a second weight. For example, the second weight may start at a value of one and may decrease as the SNR estimate increases, resulting in less noise reduction being performed as more dereverberation processing is performed, until the second weight is equal to a value of zero and the device 110 applies full dereverberation processing. While the above example illustrates the device 110 performing hybrid processing based on the SNR estimate, the disclosure is not limited thereto and the device 110 may perform hybrid processing based on the average CDR value, the average RES value, and/or the like without departing from the disclosure.

After generating the first output signal OUT(n, k) in the subband domain, the device 110 may convert (834) the first output signal OUT(n, k) from the subband domain to the time domain to generate a second output signal out(t). In some examples, the device 110 may perform additional processing to the output signal out(t) in the time domain without departing from the disclosure. For example, the device 110 may perform automatic gain control (AGC) (which may also be referred to as adaptive gain control), dynamic range compression (DRC) (which may also be referred to as dynamic range control), and/or the like without departing from the disclosure. In some examples, the device 110 may perform the additional processing in the time domain using the RES gain values, although the disclosure is not limited thereto. For example, the device 110 may use the RES gain values to estimate an amount of noise represented in the output signal and perform additional processing based on the estimated amount of noise.

FIG. 9A illustrates an example decision chart for bypassing dereverberation processing based on system conditions according to examples of the present disclosure. As illustrated in decision chart 910, the device 110 may distinguish between different system conditions. For example, the device 110 may determine whether no-speech conditions 920 are present (e.g., no near-end speech and no far-end speech, represented by near-end speech data 912a and far-end speech data 914a), near-end single-talk conditions 930 are present (e.g., near-end speech but no far-end speech, represented by near-end speech data 912b and far-end speech data 914a), far-end single-talk conditions 940 are present (e.g., far-end speech but no near-end speech, represented by near-end speech data 912a and far-end speech data 914b), or double-talk conditions 950 are present (e.g., near-end speech and far-end speech, represented by near-end speech data 912b and far-end speech data 914b).

The device 110 may determine whether to perform dereverberation based on whether far-end speech is detected. For example, when near-end speech is detected and far-end speech is not detected (e.g., during near-end single-talk conditions 930), the device 110 may perform dereverberation and apply the DER gain values to generate the output audio data. As illustrated in FIG. 9A, the device 110 may determine that near-end single-talk conditions 930 are present based on a mean residual echo suppression mask value being above a threshold φ (e.g., $RES_{average}$ close to a value of 1.0).

In contrast, when far-end speech is detected (e.g., during far-end single-talk conditions 940 and/or double-talk conditions 950), the device 110 may bypass dereverberation and not apply the DER gain values to generate the output audio data. As illustrated in FIG. 9A, the device 110 may determine that far-end speech (e.g., far-end single-talk conditions 940 or double-talk conditions 950) are present based on a mean residual echo suppression mask value being below the threshold φ (e.g., $RES_{average}$ substantially below 1.0, such as a value below 0.9).

As illustrated in FIG. 9A, the device 110 does not set specific parameters during no speech conditions 920. As there is no far-end speech or near-end speech, output audio data output by the device 110 should be relatively low in energy. As the device 110 may easily determine that the echo signal and therefore far-end speech is faint during no-speech conditions 920, the device 110 typically performs dereverberation similar to near-end single-talk conditions 930, although the disclosure is not limited thereto.

Figure 9B:
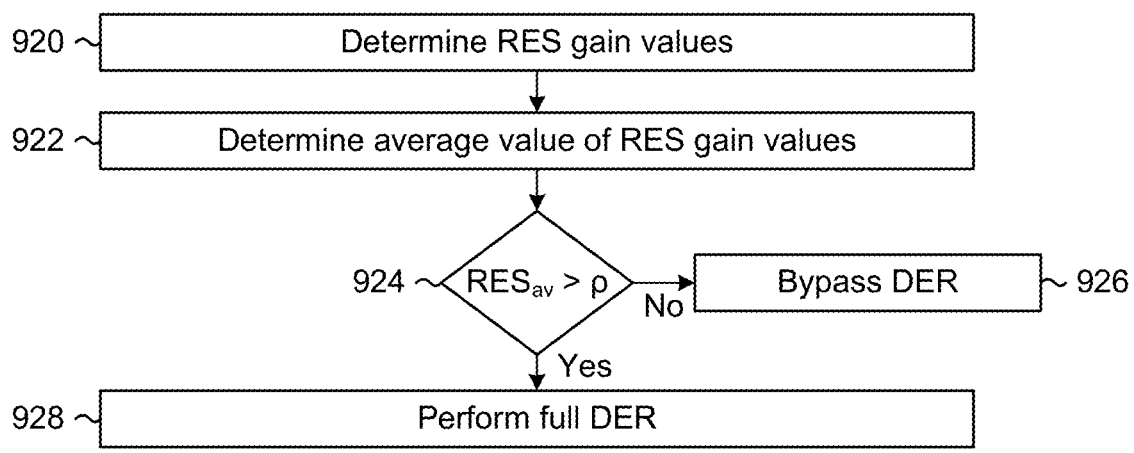
FIG. 9B is a flowchart conceptually illustrating an example method for bypassing dereverberation processing based on system conditions according to embodiments of the present disclosure.

FIG. 9B is a flowchart conceptually illustrating an example method for bypassing dereverberation processing based on system conditions according to embodiments of the present disclosure. As illustrated in FIG. 9B, the device 110 may determine (920) RES gain values used to perform residual echo suppression processing, may calculate (922) an average value $RES_{av}$ of the RES gain values, and may determine (924) whether the average value $RES_{av}$ is above a threshold value ρ (e.g., 0.9, although the disclosure is not limited thereto). If the average value $RES_{av}$ is below the threshold value ρ, the device 110 may bypass (926) dereverberation processing. If the average value $RES_{av}$ is above the threshold value ρ, the device 110 may perform (928) full dereverberation processing. Thus, the device 110 may use the average value $RES_{av}$ as a proxy to determine if far-end speech is present in the first isolated signal. For example, a first average value $RES_{av1}$ close to a value of 1.0 (e.g., above the threshold value ρ) may indicate that far-end speech is not present in the first isolated signal (e.g., the first isolated signal is not being suppressed during RES processing). In contrast, a second average value $RES_{av2}$ that is not close to a value of 1.0 (e.g., below the threshold value ρ) may indicate that far-end speech is present in the first isolated signal (e.g., at least a portion of the first isolated signal is being suppressed during RES processing).

Figure 10A:
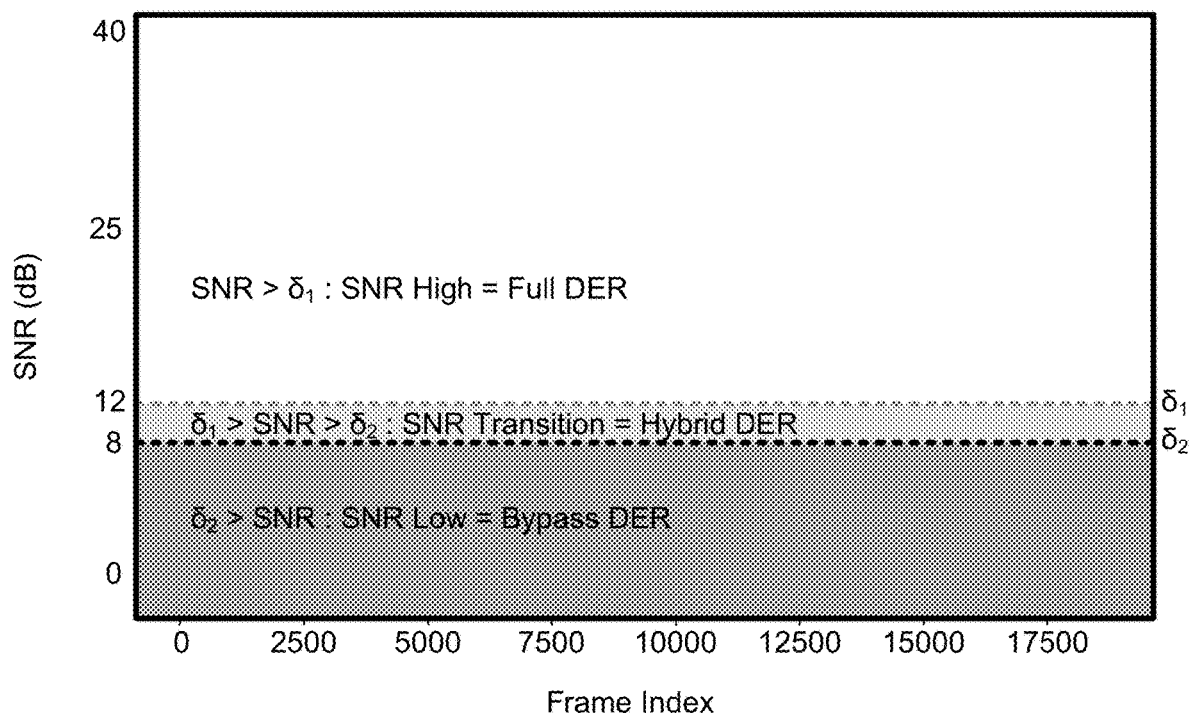
FIGS. 10A-10B illustrate a classification chart and a flowchart conceptually illustrating an example method for controlling dereverberation processing based on a signal quality metric according to embodiments of the present disclosure.
Figure 10B:
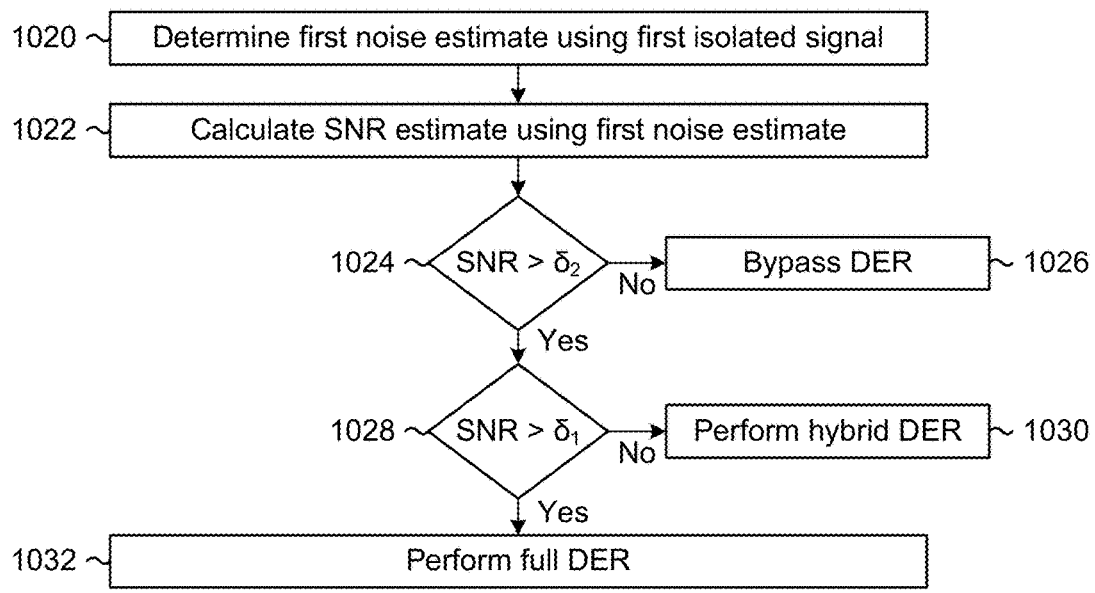

FIGS. 10A-10B illustrate a classification chart and a flowchart conceptually illustrating an example method for controlling dereverberation processing based on a signal quality metric according to embodiments of the present disclosure. As illustrated by SNR classification chart 1010 in FIG. 10A, the device 110 may determine to bypass dereverberation processing based on an SNR value. For example, the device 110 may determine an SNR value and apply full dereverberation processing when the SNR value is high (e.g., above a first threshold value $\delta_1$), hybrid dereverberation processing when the SNR value is in a transition range (e.g., below the first threshold value $\delta_1$ but above a second threshold value $\delta_2$), and bypass dereverberation processing when the SNR value is low (e.g., below the second threshold value $\delta_2$).

As illustrated in FIG. 10B, the device 110 may determine (1020) a first noise estimate using the first isolated signal, may calculate (1022) an SNR estimate using the first noise estimate, and determine (1024) whether the SNR estimate is above the second threshold value $\delta_2$. If the SNR estimate is below the second threshold value $\delta_2$, the device 110 may bypass (1026) dereverberation processing. If the SNR estimate is above the second threshold value $\delta_2$, the device 110 may determine (1028) whether the SNR estimate is above the first threshold value $\delta_1$. If the SNR estimate is below the first threshold value $\delta_1$, the device 110 may perform (1030) hybrid dereverberation processing. If the SNR estimate is above the first threshold value $\delta_1$, the device 110 may perform (1032) full dereverberation processing.

As illustrated in FIGS. 10A-10B, the device 110 may perform hybrid dereverberation processing to transition to performing full dereverberation processing. In some examples, the device 110 may transition between bypassing dereverberation processing and performing full dereverberation processing by applying attenuated DER gain values during a transition period. For example, the device 110 may use a linear transition to adjust a relative strength of noise reduction (NR) gain values and the DER gain values during the transition period.

As illustrated in FIGS. 10A-10B, the device 110 may perform hybrid dereverberation processing based on the SNR estimate. For example, the device 110 may transition from bypassing dereverberation processing entirely to applying DER gain values that are attenuated by a first weight based on the SNR estimate. The first weight increases as the SNR estimate increases, resulting in more dereverberation processing being performed, until the first weight is equal to a value of one and the device 110 applies full dereverberation processing. To maintain a consistent output signal during the transition period, the device 110 may attenuate the NR gain values by a second weight. For example, the second weight may start at a value of one and may decrease as the SNR estimate increases, resulting in less noise reduction being performed as more dereverberation processing is performed, until the second weight is equal to a value of zero and the device 110 applies full dereverberation processing.

Figure 11A:
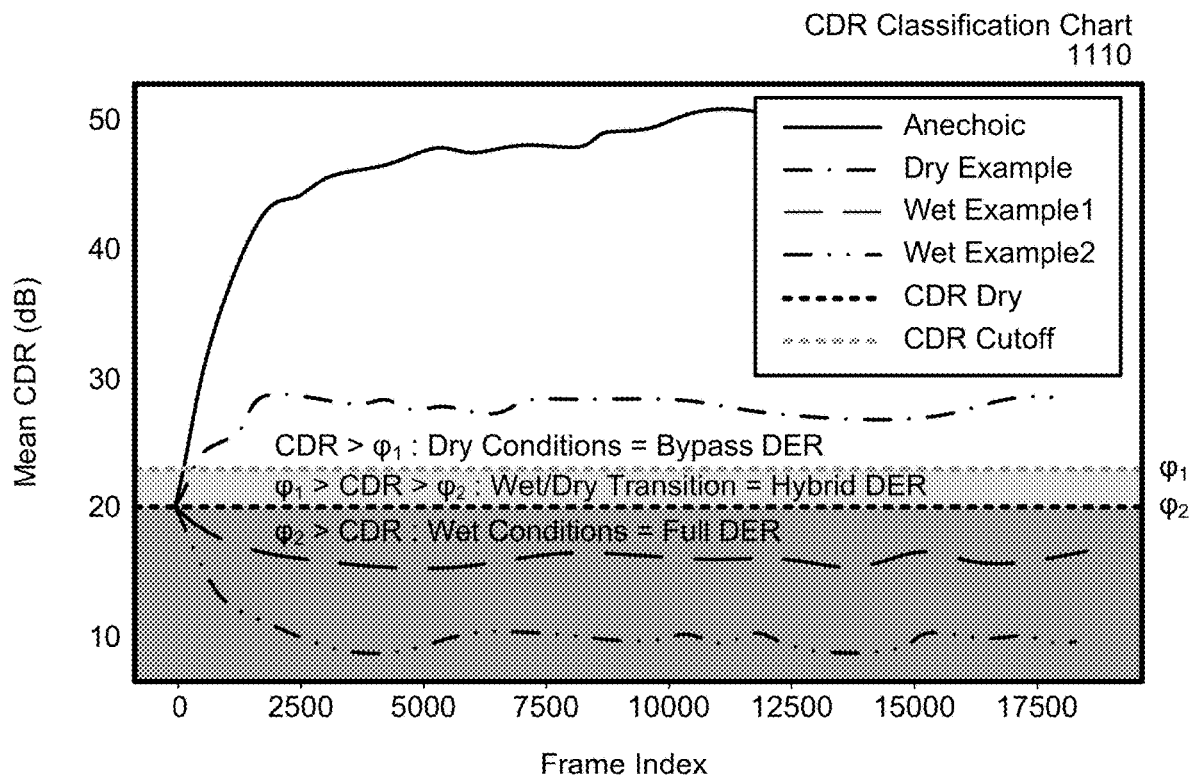
FIGS. 11A-11B illustrate a classification chart and a flowchart conceptually illustrating an example method for controlling dereverberation processing based on an amount of reverberance according to embodiments of the present disclosure.
Figure 11B:
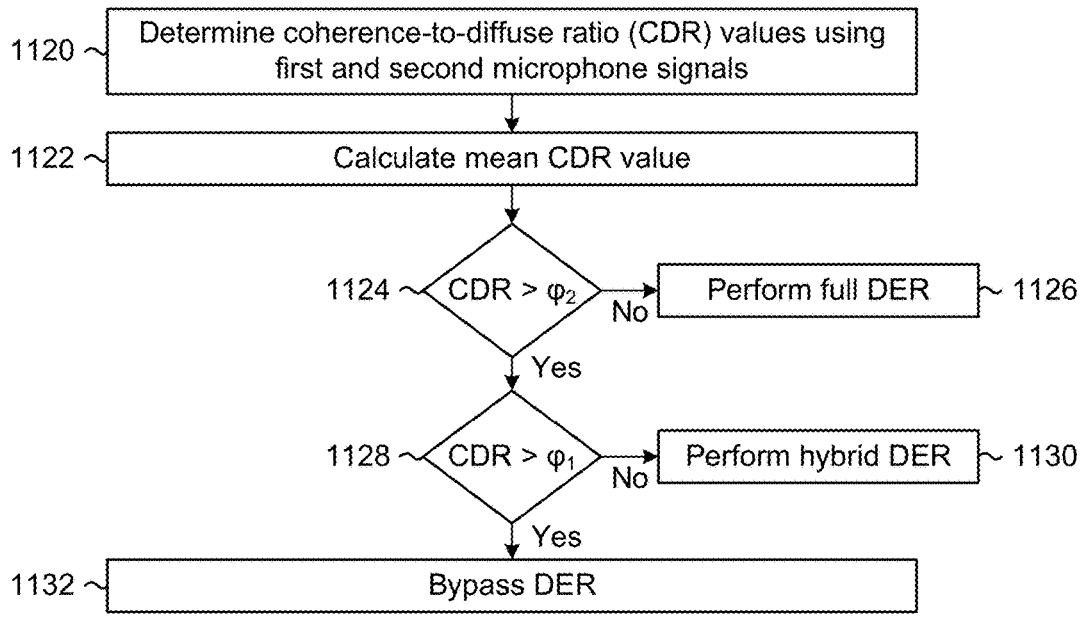

FIGS. 11A-11B illustrate a classification chart and a flowchart conceptually illustrating an example method for controlling dereverberation processing based on an amount of reverberance according to embodiments of the present disclosure. As illustrated by CDR classification chart 1110 in FIG. 11A, the device 110 may determine to bypass dereverberation processing based on a CDR value. For example, the device 110 may determine a CDR value and bypass dereverberation processing when the CDR value is high (e.g., above a first threshold value (pi), perform hybrid dereverberation processing when the CDR value is in a transition range (e.g., below the first threshold value (pi but above a second threshold value $\varphi_2$), and apply full dereverberation processing when the CDR value is low (e.g., below the second threshold value $\varphi_2$).

As illustrated in FIG. 11B, the device 110 may determine (1120) coherence-to-diffuse ratio (CDR) values using the first microphone signal and the second microphone signal, may calculate (1122) a mean CDR value using the CDR values (e.g., average of the CDR values), and may determine (1124) whether the mean CDR value is above the second threshold value $\varphi_2$. If the mean CDR value is below the second threshold value $\varphi_2$, the device 110 may perform (1126) full dereverberation processing. If the mean CDR value is above the second threshold value $\varphi_2$, the device 110 may determine (1128) whether the mean CDR value is above the first threshold value (pi. If the mean CDR value is below the first threshold value (pi, the device 110 may perform (1130) hybrid dereverberation processing. If the mean CDR value is above the first threshold value (pi, the device 110 may bypass (1132) dereverberation processing.

As illustrated in FIGS. 11A-11B, the device 110 may perform hybrid dereverberation processing to transition to performing full dereverberation processing. In some examples, the device 110 may transition between bypassing dereverberation processing and performing full dereverberation processing by applying attenuated DER gain values during a transition period. For example, the device 110 may use a linear transition to adjust a relative strength of noise reduction (NR) gain values and the DER gain values during the transition period.

As illustrated in FIGS. 11A-11B, the device 110 may perform hybrid dereverberation processing based on the average CDR value. For example, the device 110 may transition from bypassing dereverberation processing entirely to applying DER gain values that are attenuated by a first weight based on the average CDR value. The first weight increases as the average CDR value increases, resulting in more dereverberation processing being performed, until the first weight is equal to a value of one and the device 110 applies full dereverberation processing. To maintain a consistent output signal during the transition period, the device 110 may attenuate the NR gain values by a second weight. For example, the second weight may start at a value of one and may decrease as the average CDR value increases, resulting in less noise reduction being performed as more dereverberation processing is performed, until the second weight is equal to a value of zero and the device 110 applies full dereverberation processing.

FIG. 12 illustrates examples of performing dereverberation processing using frequency dependent parameters according to embodiments of the present disclosure. In order to preserve high frequency components of speech while also applying dereverberation processing, in some examples the device 110 may apply frequency dependent parameters to perform dereverberation. As illustrated in FIG. 12, in some examples the device 110 may apply two frequency dependent parameters, illustrated in frequency dependent parameters chart 1210. Alternatively, in other examples the device 110 may apply a single frequency dependent parameter, illustrated in frequency dependent parameters chart 1220.

The device 110 may distinguish between low frequency components (e.g., any frequency below spatial aliasing frequency) and high frequency components (e.g., any frequency above spatial aliasing frequency). The spatial aliasing frequency may be calculated using the speed of sound c and the distance d between the two microphones (e.g., $f_{sa}=c/2d$). As illustrated in FIG. 12, the spatial aliasing frequency may correspond to a first frequency band (e.g., 40).

As illustrated in frequency dependent parameters chart 1210, in some examples the device 110 may apply two frequency dependent parameters. For example, the device 110 may select an oversubtraction factor $\mu$ and a forgetting factor $\lambda$ based on frequency in order to preserve high frequency components of speech. As illustrated in FIG. 12, the device 110 may select a smaller forgetting factor $\lambda$ in lower frequency bands (e.g., in order to achieve perceivable dereverberation) and select a larger forgetting factor $\lambda$ in higher frequency bands (e.g., in order to preserve high frequency components of speech), ranging from a minimum value of 0.05 to a maximum value of 0.30, although the disclosure is not limited thereto.

The device 110 may do the opposite for the oversubtraction factor $\mu$. For example, the device 110 may select a larger oversubtraction factor $\mu$ in lower frequency bands (e.g., in order to achieve perceivable dereverberation and avoid degradation in a dry room) and select a smaller oversubtraction factor $\mu$ in higher frequency bands (e.g., in order to preserve high frequency components of speech), ranging from a maximum value above 12 to a minimum value below 2, although the disclosure is not limited thereto.

As illustrated in FIG. 12, the device 110 may vary these two parameters using a simple sigmoid function, although the disclosure is not limited thereto. In some examples, the device 110 may select a constant oversubtraction factor $\mu$ and only select the forgetting factor $\lambda$ based on frequency, as illustrated by the frequency dependent parameters chart 1220.

Figure 13:
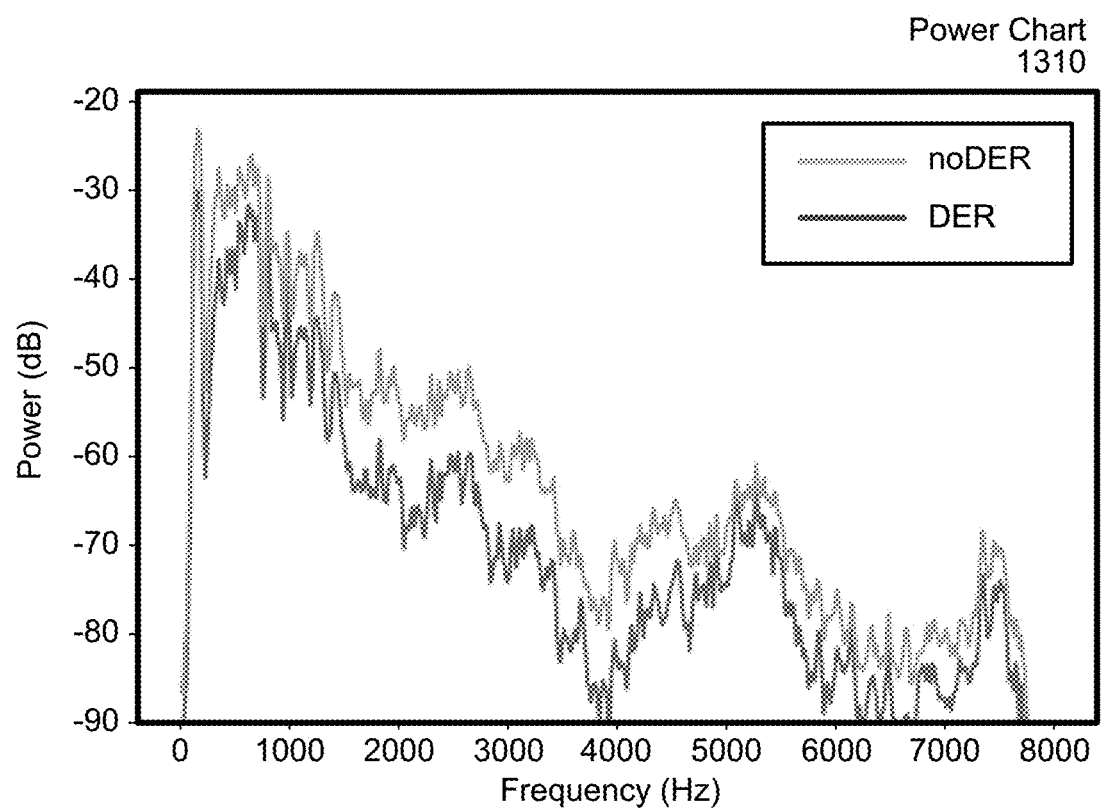
FIG. 13 illustrates a power chart representing output power levels when dereverberation processing is performed or bypassed according to embodiments of the present disclosure.

FIG. 13 illustrates a power chart representing output power levels when dereverberation processing is performed or bypassed according to embodiments of the present disclosure. As illustrated in FIG. 13, there is a noticeable decrease or attenuation in the output power levels when dereverberation processing is performed. To achieve a constant output power level, whether dereverberation processing is performed or bypassed, the device 110 may modify gain values used during noise reduction and automatic gain control.

Figure 14A:
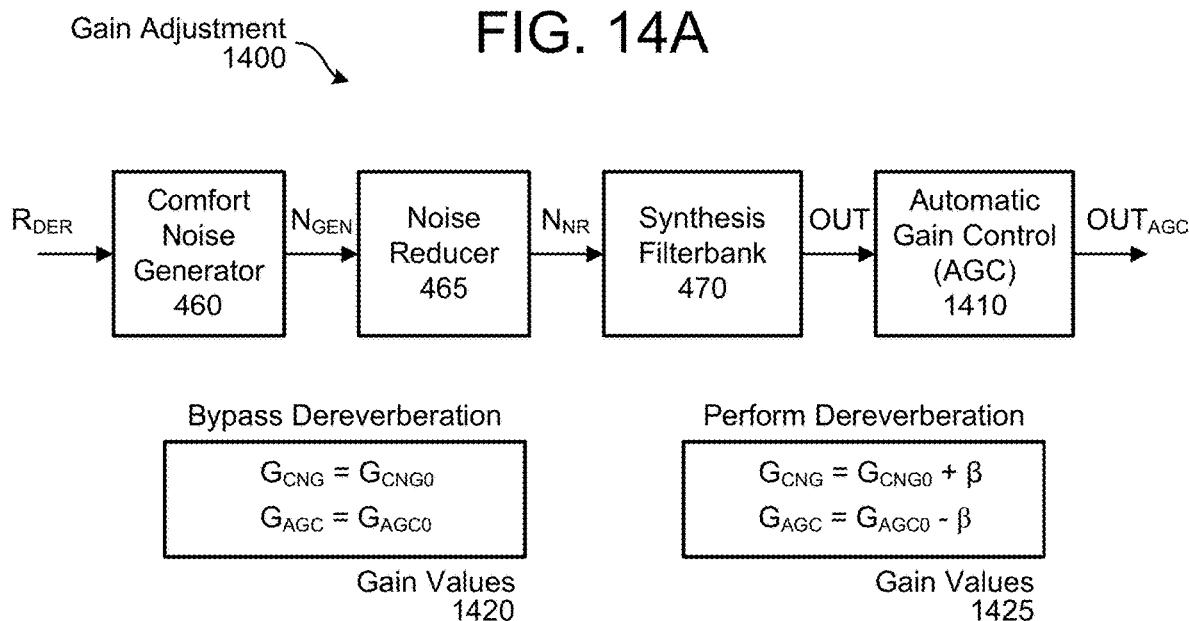
FIGS. 14A-14B illustrate a component diagram and a flowchart conceptually illustrating an example method for modifying gain values during dereverberation processing according to embodiments of the present disclosure.
Figure 14B:
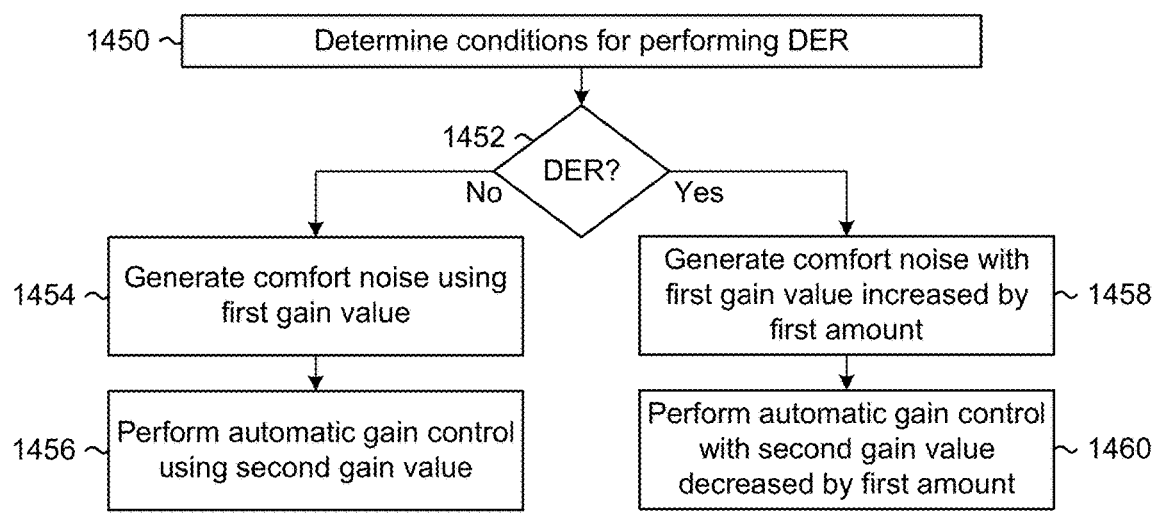

FIGS. 14A-14B illustrate a component diagram and a flowchart conceptually illustrating an example method for modifying gain values during dereverberation processing according to embodiments of the present disclosure. As illustrated in FIG. 14A, the audio pipeline may include a comfort noise generator (CNG) component 460, a noise reducer (NR) component 465 (which may also be referred to as noise reduction), a synthesis filterbank 470, and an automatic gain control (AGC) component 1410 (which may also be referred to as adaptive gain control). For example, the dereverberated signal $R_{DER}$ may be input to the comfort noise generator 460, which may generate comfort noise using a comfort noise gain ($G_{CNG}$) to generate a first noise signal $N_{GEN}$. The noise reducer component 465 may receive the first noise signal $N_{GEN}$ and perform noise reduction to generate a second noise signal N. The synthesis filterbank 470 may convert the second noise signal to a first output signal OUT in the time domain, and the AGC component 1410 may perform AGC to generate a second output signal $OUT_{AGC}$.

As illustrated in FIG. 14A, the device 110 may perform gain adjustment 1400 to achieve a constant output level during dereverberation processing. For example, the device 110 may apply first gain values 1420 when the device 110 bypasses dereverberation processing, whereas the device 110 may apply second gain values 1425 when the device 110 performs dereverberation processing. To illustrate an example, the first gain values 1420 include CNG values $G_{CNG}$ and AGC gain values $G_{AGC}$. Thus, the comfort noise generator component 460 may apply the CNG values $G_{CNG}$ and the AGC component 1410 may apply the AGC gain values $G_{AGC}$ when the dereverberation processing is bypassed. However, the second gain values 1425 increase the CNG gain values $G_{CNG}$ by a first amount $\beta$ and decrease the AGC gain values $G_{AGC}$ by the first amount $\beta$.

As illustrated in FIG. 14B, the device 110 may determine (145) conditions for performing dereverberation processing and may determine (1452) whether to perform dereverberation processing. If the device 110 determines not to perform dereverberation processing, the device 110 may generate (1454) comfort noise using a first gain value and may perform (1456) automatic gain control using a second gain value. If the device 110 determines to perform dereverberation processing, the device 110 may generate (1458) comfort noise with the first gain value increased by a first amount and may perform (1460) automatic gain control with the second gain value decreased by the first amount. Thus, the device 110 may adjust the gain values to achieve a constant output level during dereverberation processing.

While FIGS. 14A-14B illustrate examples that refer to a single gain value, the disclosure is not limited thereto and the first amount $\beta$ may be applied to multiple gain values without departing from the disclosure. For example, the CNG values $G_{CNG}$ and/or the AGC gain values $G_{AGC}$ may include a plurality of gain values, with an individual gain value for each frequency range or frequency band. However, the disclosure is not limited thereto, and the device 110 may apply a single CNG value $G_{CNG}$ and/or AGC gain value $G_{AGC}$ for the entire frequency range without departing from the disclosure.

Figure 15:
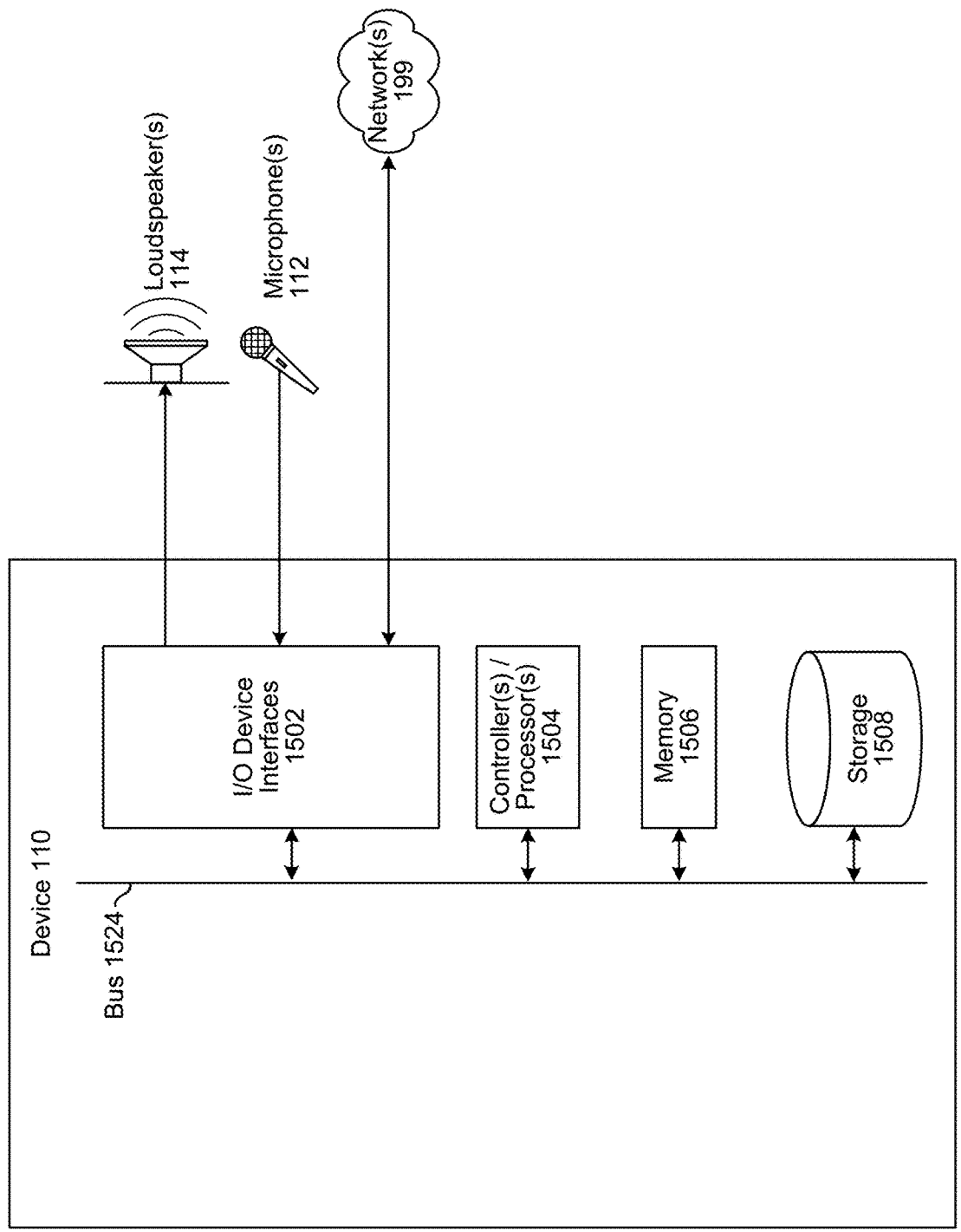
FIG. 15 is a block diagram conceptually illustrating example components of a system according to embodiments of the present disclosure.

FIG. 15 is a block diagram conceptually illustrating example components of a system according to embodiments of the present disclosure. In operation, the system 100 may include computer-readable and computer-executable instructions that reside on the device 110, as will be discussed further below.

The device 110 may include one or more audio capture device(s), such as a microphone array which may include one or more microphones 112. The audio capture device(s) may be integrated into a single device or may be separate. The device 110 may also include an audio output device for producing sound, such as loudspeaker(s) 114. The audio output device may be integrated into a single device or may be separate.

As illustrated in FIG. 15, the device 110 may include an address/data bus 1524 for conveying data among components of the device 110. Each component within the device 110 may also be directly connected to other components in addition to (or instead of) being connected to other components across the bus 1524.

The device 110 may include one or more controllers/processors 1504, which may each include a central processing unit (CPU) for processing data and computer-readable instructions, and a memory 1506 for storing data and instructions. The memory 1506 may include volatile random access memory (RAM), non-volatile read only memory (ROM), non-volatile magnetoresistive (MRAM) and/or other types of memory. The device 110 may also include a data storage component 1508, for storing data and controller/processor-executable instructions (e.g., instructions to perform operations discussed herein). The data storage component 1508 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 1502.

The device 110 includes input/output device interfaces 1502. A variety of components may be connected through the input/output device interfaces 1502. For example, the device 110 may include one or more microphone(s) 112 (e.g., a plurality of microphone(s) 112 in a microphone array), one or more loudspeaker(s) 114, and/or a media source such as a digital media player (not illustrated) that connect through the input/output device interfaces 1502, although the disclosure is not limited thereto. Instead, the number of microphone(s) 112 and/or the number of loudspeaker(s) 114 may vary without departing from the disclosure. In some examples, the microphone(s) 112 and/or loudspeaker(s) 114 may be external to the device 110, although the disclosure is not limited thereto. The input/output interfaces 1502 may include A/D converters (not illustrated) and/or D/A converters (not illustrated).

The input/output device interfaces 1502 may also include an interface for an external peripheral device connection such as universal serial bus (USB), FireWire, Thunderbolt, Ethernet port or other connection protocol that may connect to network(s) 199.

The input/output device interfaces 1502 may be configured to operate with network(s) 199, for example via an Ethernet port, a wireless local area network (WLAN) (such as WiFi), Bluetooth, ZigBee and/or wireless networks, such as a Long Term Evolution (LTE) network, WiMAX network, 3G network, etc. The network(s) 199 may include a local or private network or may include a wide network such as the internet. Devices may be connected to the network(s) 199 through either wired or wireless connections.

The device 110 may include components that may comprise processor-executable instructions stored in storage 1508 to be executed by controller(s)/processor(s) 1504 (e.g., software, firmware, hardware, or some combination thereof). For example, components of the device 110 may be part of a software application running in the foreground and/or background on the device 110. Some or all of the controllers/components of the device 110 may be executable instructions that may be embedded in hardware or firmware in addition to, or instead of, software. In one embodiment, the device 110 may operate using an Android operating system (such as Android 4.3 Jelly Bean, Android 4.4 KitKat or the like), an Amazon operating system (such as FireOS or the like), or any other suitable operating system.

Computer instructions for operating the device 110 and its various components may be executed by the controller(s)/processor(s) 1504, using the memory 1506 as temporary "working" storage at runtime. The computer instructions may be stored in a non-transitory manner in non-volatile memory 1506, storage 1508, or an external device. Alternatively, some or all of the executable instructions may be embedded in hardware or firmware in addition to or instead of software.

Multiple devices may be employed in a single device 110. In such a multi-device device, each of the devices may include different components for performing different aspects of the processes discussed above. The multiple devices may include overlapping components. The components listed in any of the figures herein are exemplary, and may be included a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, wearable computing devices (watches, glasses, etc.), other mobile devices, video game consoles, speech processing systems, distributed computing environments, etc. Thus the components, components and/or processes described above may be combined or rearranged without departing from the scope of the present disclosure. The functionality of any component described above may be allocated among multiple components, or combined with a different component. As discussed above, any or all of the components may be embodied in one or more general-purpose microprocessors, or in one or more special-purpose digital signal processors or other dedicated microprocessing hardware. One or more components may also be embodied in software implemented by a processing unit. Further, one or more of the components may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. Some or all of the fixed beamformer, acoustic echo canceller (AEC), adaptive noise canceller (ANC) unit, residual echo suppression (RES), double-talk detector, etc. may be implemented by a digital signal processor (DSP).

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
    sending, by a device, reference audio data to a loudspeaker of the device;
    receiving, from a first microphone of the device, first microphone audio data including a first representation of speech;
    receiving, from a second microphone of the device, second microphone audio data including a second representation of the speech;
    determining, using a first portion of the first microphone audio data and a first portion of the second microphone audio data, first data representing first coherence-to-diffuse ratio (CDR) values;
    determining, using the first data, first gain value data configured to suppress reverberations represented in the first portion of the first microphone audio data;
    performing, using the reference audio data and the first microphone audio data, echo cancellation to generate third microphone audio data corresponding to the first microphone;
    determining a first signal-to-noise ratio (SNR) value for a first portion of the third microphone audio data;
    determining that the first SNR value exceeds a first threshold value indicating that noisy conditions are not present;
    performing residual echo suppression on the first portion of the third microphone audio data to generate a first portion of first audio data;
    performing dereverberation by applying the first gain value data to the first portion of the first audio data to generate a first portion of second audio data;
    determining, using the first portion of the second audio data, first noise estimate data; and
    performing noise reduction, using the first noise estimate data, on the first portion of the second audio data to generate a first portion of output audio data.

2. The computer-implemented method of claim 1, further comprising:
    determining second noise estimate data using a second portion of the third microphone audio data;
    determining, using the second noise estimate data, a second SNR value for the second portion of the third microphone audio data;
    determining that the second SNR value is less than the first threshold value;
    performing residual echo suppression on the second portion of the third microphone audio data to generate a second portion of the first audio data; and
    performing noise reduction, using the second noise estimate data, on the second portion of the first audio data to generate a second portion of the output audio data.

3. The computer-implemented method of claim 1, further comprising:
    determining that far-end speech is represented in a second portion of the third microphone audio data;
    performing residual echo suppression on the second portion of the third microphone audio data to generate a second portion of the first audio data; and
    performing noise reduction, using the second noise estimate data, on the second portion of the first audio data to generate a second portion of the output audio data.

4. The computer-implemented method of claim 1, further comprising:
    determining, using a second portion of the first microphone audio data and a second portion of the second microphone audio data, second data representing second CDR values;
    determining, using the second data, an average CDR value corresponding to a second portion of the third microphone audio data;
    determining that the average CDR value exceeds a second threshold value indicating that reverberant conditions are not present;
    performing residual echo suppression on the second portion of the third microphone audio data to generate a second portion of the first audio data; and performing noise reduction, using the second noise estimate data, on the second portion of the first audio data to generate a second portion of the output audio data.

5. A computer-implemented method, the method comprising:
receiving reference audio data corresponding to audio generated by a loudspeaker;
receiving first microphone audio data associated with a first microphone;
receiving second microphone audio data associated with a second microphone;
determining, using the first microphone audio data and the second microphone audio data, first data representing first coherence-to-diffuse ratio (CDR) values;
determining, using the first data, first gain value data;
performing, using the reference audio data and the first microphone audio data, echo cancellation to generate third microphone audio data associated with the first microphone;
performing residual echo suppression on the third microphone audio data to generate first audio data; and
performing, using the first gain value data, dereverberation on the first audio data to generate second audio data.

6. The computer-implemented method of claim 5, further comprising:
determining first noise estimate data using the second audio data;
performing, using the first noise estimate data, noise reduction on the second audio data to generate a first portion of output audio data, the first portion of the output audio data corresponding to a first portion of the third microphone audio data;
determining that a second portion of the third microphone audio data does not satisfy a condition;
determining second noise estimate data using the second portion of the third microphone audio data;
performing the residual echo suppression on the second portion of the third microphone audio data to generate third audio data;
performing, using the second noise estimate data, the noise reduction on the third audio data to generate a second portion of the output audio data; and
generating the output audio data by combining the first portion of the output audio data and the second portion of the output audio data.

7. The computer-implemented method of claim 5, wherein performing dereverberation further comprises applying the first gain value data to the first audio data to generate the second audio data, the method further comprising:
determining noise estimate data using the second audio data; and
performing, using the noise estimate data, noise reduction on the second audio data to generate output audio data.

8. The computer-implemented method of claim 5, further comprising:
determining a first signal-to-noise ratio (SNR) value associated with a first portion of the third microphone audio data;
determining that the first SNR value satisfies a condition;
determining, using a first portion of the first microphone audio data and a first portion of the second microphone audio data, a first portion of the first data;
determining, using the first portion of the first data, the first gain value data;
performing the residual echo suppression on the first portion of the third microphone audio data to generate a first portion of the first audio data;
performing the dereverberation by applying the first gain value data to the first portion of the first audio data to generate a first portion of the second audio data; and
performing noise reduction on the first portion of the second audio data to generate a first portion of output audio data.

9. The computer-implemented method of claim 8, further comprising:
determining a second signal-to-noise ratio (SNR) value associated with a second portion of the third microphone audio data;
determining that the second SNR value does not satisfy the condition;
performing the residual echo suppression on the second portion of the third microphone audio data to generate a second portion of the first audio data;
performing the noise reduction on the second portion of the first audio data to generate a second portion of the output audio data; and
generating the output audio data by combining the first portion of the output audio data and the second portion of the output audio data.

10. The computer-implemented method of claim 5, further comprising:
performing noise reduction on the second audio data to generate a first portion of output audio data, the first portion of the output audio data corresponding to a first portion of the third microphone audio data;
determining that far-end speech is represented in a second portion of the third microphone audio data;
performing the residual echo suppression on the second portion of the third microphone audio data to generate third audio data;
performing the noise reduction on the third audio data to generate a second portion of the output audio data; and
generating the output audio data by combining the first portion of the output audio data and the second portion of the output audio data.

11. The computer-implemented method of claim 5, further comprising:
performing noise reduction on the second audio data to generate a first portion of output audio data, the first portion of the output audio data corresponding to a first portion of the third microphone audio data;
determining, using a second portion of the first microphone audio data and a second portion of the second microphone audio data, second data representing second CDR values;
determining, using the second data, an average CDR value corresponding to a second portion of the third microphone audio data;
determining that the average CDR value exceeds a threshold value;
performing the residual echo suppression on the second portion of the third microphone audio data to generate third audio data;
performing the noise reduction on the third audio data to generate a second portion of the output audio data; and
generating the output audio data by combining the first portion of the output audio data and the second portion of the output audio data.

12. The computer-implemented method of claim 5, wherein determining the first data further comprises:
- determining a first power spectral density (PSD) function associated with the first microphone audio data;
- determining a second PSD function associated with the second microphone audio data;
- determining a cross-PSD function using the first microphone audio data and the second microphone audio data; and
- determining the first data using the first PSD function, the second PSD function, and the cross-PSD function.

13. A system comprising:
- at least one processor; and
- memory including instructions operable to be executed by the at least one processor to cause the system to:
  - receive reference audio data corresponding to audio generated by a loudspeaker;
  - receive first microphone audio data associated with a first microphone;
  - receive second microphone audio data associated with a second microphone;
  - determine, using the first microphone audio data and the second microphone audio data, first data representing first coherence-to-diffuse ratio (CDR) values;
  - determine, using the first data, first gain value data;
  - perform, using the reference audio data and the first microphone audio data, echo cancellation to generate third microphone audio data associated with the first microphone;
  - perform residual echo suppression on the third microphone audio data to generate first audio data; and
  - perform, using the first gain value data, dereverberation on the first audio data to generate second audio data.

14. The system of claim 13, wherein the memory further comprises instructions that, when executed by the at least one processor, further cause the system to:
- determine first noise estimate data using the second audio data;
- perform, using the first noise estimate data, noise reduction on the second audio data to generate a first portion of output audio data, the first portion of the output audio data corresponding to a first portion of the third microphone audio data;
- determine that a second portion of the third microphone audio data does not satisfy a condition;
- determine second noise estimate data using the second portion of the third microphone audio data;
- perform the residual echo suppression on the second portion of the third microphone audio data to generate third audio data;
- perform, using the second noise estimate data, the noise reduction on the third audio data to generate a second portion of the output audio data; and
- generate the output audio data by combining the first portion of the output audio data and the second portion of the output audio data.

15. The system of claim 13, wherein the memory further comprises instructions that, when executed by the at least one processor, further cause the system to:
- determine noise estimate data using the second audio data; and
- perform, using the noise estimate data, noise reduction on the second audio data to generate output audio data.

16. The system of claim 13, wherein the memory further comprises instructions that, when executed by the at least one processor, further cause the system to:
- determine a first signal-to-noise ratio (SNR) value associated with a first portion of the third microphone audio data;
- determine that the first SNR value satisfies a condition;
- determine, using a first portion of the first microphone audio data and a first portion of the second microphone audio data, a first portion of the first data;
- determine, using the first portion of the first data, the first gain value data;
- perform the residual echo suppression on the first portion of the third microphone audio data to generate a first portion of the first audio data;
- perform the dereverberation by applying the first gain value data to the first portion of the first audio data to generate a first portion of the second audio data; and
- perform noise reduction on the first portion of the second audio data to generate a first portion of output audio data.

17. The system of claim 16, wherein the memory further comprises instructions that, when executed by the at least one processor, further cause the system to:
- determine a second signal-to-noise ratio (SNR) value associated with a second portion of the third microphone audio data;
- determine that the second SNR value does not satisfy the condition;
- perform the residual echo suppression on the second portion of the third microphone audio data to generate a second portion of the first audio data;
- perform the noise reduction on the second portion of the first audio data to generate a second portion of the output audio data; and
- generate the output audio data by combining the first portion of the output audio data and the second portion of the output audio data.

18. The system of claim 13, wherein the memory further comprises instructions that, when executed by the at least one processor, further cause the system to:
- perform noise reduction on the second audio data to generate a first portion of output audio data, the first portion of the output audio data corresponding to a first portion of the third microphone audio data;
- determine that far-end speech is represented in a second portion of the third microphone audio data;
- perform the residual echo suppression on the second portion of the third microphone audio data to generate third audio data;
- perform the noise reduction on the third audio data to generate a second portion of the output audio data; and
- generate the output audio data by combining the first portion of the output audio data and the second portion of the output audio data.

19. The system of claim 13, wherein the memory further comprises instructions that, when executed by the at least one processor, further cause the system to:
- perform noise reduction on the second audio data to generate a first portion of output audio data, the first portion of the output audio data corresponding to a first portion of the third microphone audio data;
- determine, using a second portion of the first microphone audio data and a second portion of the second microphone audio data, second data representing second CDR values;

determine, using the second data, an average CDR value corresponding to a second portion of the third microphone audio data;

determine that the average CDR value exceeds a threshold value;

perform the residual echo suppression on the second portion of the third microphone audio data to generate third audio data;

perform the noise reduction on the third audio data to generate a second portion of the output audio data; and generate the output audio data by combining the first portion of the output audio data and the second portion of the output audio data.

20. The system of claim 13, wherein the memory further comprises instructions that, when executed by the at least one processor, further cause the system to:

determine a first power spectral density (PSD) function associated with the first microphone audio data;

determine a second PSD function associated with the second microphone audio data;

determine a cross-PSD function using the first microphone audio data and the second microphone audio data; and determine the first data using the first PSD function, the second PSD function, and the cross-PSD function.

* * * * *